United States Patent
Goto

(10) Patent No.: US 9,641,718 B2
(45) Date of Patent: May 2, 2017

(54) COPYING MACHINE AND PRINTER

(71) Applicant: BROTHER KOGYO KABUSHIKI KAISHA, Nagoya, Aichi (JP)

(72) Inventor: Keigo Goto, Aichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/959,487

(22) Filed: Dec. 4, 2015

(65) Prior Publication Data

US 2016/0165089 A1 Jun. 9, 2016

(30) Foreign Application Priority Data

Dec. 5, 2014 (JP) ................................ 2014-246566

(51) Int. Cl.
| | | |
|---|---|---|
| G05F 3/12 | (2006.01) |
| H04N 1/21 | (2006.01) |
| H04N 1/32 | (2006.01) |
| H04N 1/10 | (2006.01) |
| H04N 1/00 | (2006.01) |
| H04N 1/60 | (2006.01) |

(52) U.S. Cl.
CPC ......... *H04N 1/2104* (2013.01); *H04N 1/0057* (2013.01); *H04N 1/10* (2013.01); *H04N 1/32464* (2013.01); *H04N 1/60* (2013.01); *H04N 2201/0091* (2013.01)

(58) Field of Classification Search
None
See application file for complete search history.

(56) References Cited

U.S. PATENT DOCUMENTS

| | | | | |
|---|---|---|---|---|
| 5,854,693 A | * | 12/1998 | Yoshiura | ............ H04N 1/32523 358/1.1 |
| 6,130,757 A | * | 10/2000 | Yoshida | ............. H04N 1/00915 358/1.14 |
| 6,348,974 B1 | * | 2/2002 | Takahashi | .......... H04N 1/32486 358/1.15 |

FOREIGN PATENT DOCUMENTS

| | | |
|---|---|---|
| JP | H11-046291 A | 2/1999 |
| JP | 2001-094746 A | 4/2001 |
| JP | 4492625 B2 | 6/2010 |

* cited by examiner

*Primary Examiner* — Huo Long Chen
(74) *Attorney, Agent, or Firm* — Scully, Scott, Murphy & Presser, P.C.

(57) ABSTRACT

A copying machine is configured to execute a first scanning process to scan an image on an original sheet and generate image data, which is stored in a storage of the copying machine and an external processing device, a printing process to print the image of the original sheet, a second scanning process to release an image data storing area of the storage, and store the image data in the storage and the external processing device, a transmission process to release the image data storing area of the storage, and transmit the image data from the external processing device to the storage, and a detection process to detect whether a free capacity of the storage becomes less than a particular value.

10 Claims, 16 Drawing Sheets

COPYING MACHINE AND PRINTER

CROSS-REFERENCE TO RELATED APPLICATION

This application claims priority under 35 U.S.C. §119 from Japanese Patent Application No. 2014-246566 filed on Dec. 5, 2014. The entire subject matter of the application is incorporated herein by reference.

BACKGROUND

Technical Field

The present disclosures relate to a copying machine, and a printer employed in a copying machine.

Related Art

There is known a copying machine having a scanner, a storage, a printer and capable of executing a so-called sort-copying function. The sort-copying function is known as a function to scan an original document having multiple sheets to generate image data, and print multiple copies of the original document, copy by copy, based on the image data output by the scanner.

Typically, when the sort-copying is executed in such a copying machine, image data representing images of multiple pages of the original document output by the scanner is once stored in the storage. Then, the printer retrieves the image data stored in the storage, from the first page to the last page, to print one entire copy of the original document. After the first copy of the original document is printed, the printer retrieves the image data again, from the first page to the last page of the original document, and print another copy of the original document. In such a way, by repeating retrieval of the image data and printing one copy of the original document based on the retrieved image data, a desired number of copies of the original document are printed.

SUMMARY

When the size of the image data corresponding to the multiple pages of original document exceeds a free capacity of the storage of the copying machine, the sort-copying cannot be executed with use of the storage. According to a conventional technique, in such a case, an external processing device is also used to execute the sort-copying operation.

For example, the copying machine may be configured such that the free capacity of the storage of the copying machine is monitored during scanning of the multiple pages of original document. Until the free capacity of the storage of the copying machine becomes equal to or less than a threshold value, the image data output by the scanner is stored in the storage of the copying machine. When the free capacity of the storage becomes equal to or less than the threshold value, the image data output by the scanner thereafter is transmitted to an external processing device through a communication unit, and is stored in a storage device of the external processing device. Then, for the pages of which image data is stored in the storage of the copying machine, printing is executed based on the image data stored in the storage of the copying machine, and the image data stored in the external processing device is executed based on the image data stored in the storage device of the external processing device.

In the conventional copying machine making use of the external processing device, depending on variation of a communicating speed between the copying machine and the external processing device, a time necessary to transmit the image data from the external processing device to the copying machine may become longer than a time period necessary to transmit the image data from the storage to the printer, and the number of printed sheets per unit time may be reduced. If the sort-copying is executed in such a state, a relatively long period may be required to complete the sort-copying.

In consideration of the above problem, aspects of the disclosures provide an improved technique according to which the above-described problem of reduction of the number of printed sheets per unit time can be suppressed.

According to aspects of the disclosures, there is provided a copying machine, which is provided with a scanner configured to scan an image formed on an original sheet and generate image data, an original table configured such that multiple original sheets can be placed on the original table, an original conveyer configured to convey the multiple original sheets placed on the original table to the scanner one by one, a storage configured to store the image data generated by the scanner a printer configured to print images on printing sheets based on the image data stored in the storage, a communication unit configured to communicate with an external processing device which is capable of storing the image data, an original sensor configured to detects whether the original sheet is present on the original table, and a controller. The controller is configured to execute a copying process which includes a first scanning process in which the controller causes the original conveyer to convey the multiple original sheets to the scanner one by one, stores the image data generated by the scanner in the storage in a scanned order, transmits the image data to the external processing device via the communication unit, and causes the external processing device to store the image data, a printing process in which the controller causes the printer to print a particular number of copies of the images of the original sheets copy by copy, one copy including the images of the original sheets in the scanned order, a second scanning process in which the controller releases an area of the storage storing the image data, printing of which by the printer has been completed, causes the original conveyer to convey the multiple original sheets to the scanner one by one, stores the image data generated by the scanner to in the storage in the scanned order, transmits the image data to the external processing device via the communication unit, and causes the external processing device to store the image data, a transmission process in which the controller releases an area of the storage storing the image data, printing of which by the printer has been completed, causing the communication unit to retrieve the image data stored in the external processing device in the scanned order, and storing the retrieved image data in the storage, a detecting process in which the controller detects whether a free capacity of the storage is less than a particular threshold value. Further, in the copying process, the controller is further configured to terminate the first scanning process, and execute the printing process until the particular number of copies of the images of the original sheets are printed when it is detected that the original sheet is absent on the original table, after the first scanning process and the printing process have been started and before the free capacity of the storage is detected to be less than the particular threshold value, terminate the first scanning process, and execute the second scanning process when it is detected that the free capacity of the storage is less than the particular threshold value, after the first scanning process and the printing process have been started and before the original sheet is detected to be absent on the original table, and terminate the second scanning process, and execute the transmission process and the printing process until the particular number of copies of the images of the original sheets are printed when it is detected, after the second scanning process has been started, the original sheet is absent on the original table.

According to further aspects of the disclosures, there is provided a printing device, which is provided with a receiver unit configured to receive image data, a storage configured to store the image data received by the receiver, a printer configured to print images on printing sheets based on the image data stored in the storage, a communication unit configured to communicate with an external processing device which is capable of storing the image data; and a controller. The controller is configured to execute a printing process which includes a first receiving process in which the controller stores the image data received by the receiver in the storage in a received order, transmits the image data to the external processing device via the communication unit, and causes the external processing device to store the image data in the received order, a printing process in which the controller causes the printer to print a particular number of copies of the images corresponding to the image data in accordance with the image data stored in the storage, a second receiving process in which the controller releases an area of the storage storing the image data, printing of which by the printer has completed, stores the image data received by the receiver in the storage in the received order, transmits the image data to the external processing device via the communication unit, and causes the external processing device to store the image data in the received order, a transmission process in which the controller releases an area of the storage storing the image data, printing of which by the printer has been completed, causing the communication unit to retrieve the image data stored in the external processing device in the received order, and storing the retrieved image data in the storage, a detecting process in which the controller detects whether a free capacity of the storage is less than a particular threshold value, and a receipt completion determining process in which the controller determines whether receipt of the image data with the receiver has completed. Further, in the printing process, the controller is configured to terminate the first receiving process, and execute the printing process until the particular number of copies of the images represented by the image data are printed when it is determined in the receipt completion determining process that receipt of the image data with the receiver has been completed, after the first receiving process and the printing process have been started and before the free capacity of the storage is detected to be less than the particular threshold value, terminate the first receiving process, and execute the second receiving process when it is detected that the free capacity of the storage is less than the particular threshold value, after the first receiving process and the printing process have been started and before the original sheet is detected to be absent on the original table; and terminate the second receiving process, and execute the transmission process and the printing process until the particular number of copies of the images represented by the image data are printed when it is determined in the receipt completion determining process that receipt of the image data with the receiver has been completed.

According to further aspects of the disclosures, there is provided a copying machine, which is provided with a scanner configured to scan an image formed on an original sheet and generate image data, a storage configured to store the image data generated by the scanner, a printer configured to print an images on a printing sheet based on the image data stored in the storage, a communication unit configured to communicate with an external processing device, an original table on which multiple original sheets can be placed, an original conveyer configured to convey the multiple original sheets placed on the original table to the scanner one by one, an original sensor configured to detects whether an original sheet is present on the original table, an instruction obtaining unit, and a controller. The scanner is configured to scan images on the original sheets conveyed by the original conveyer. Further, the controller is configured to execute a copying process which includes a number of copy setting process in which the controller receives a user input of a number of copies to be printed, a scanning process in which the controller causes the scanner to scan images on the original sheets for a particular period from receipt of an instruction to execute scanning of the multiple original sheets through the instruction obtaining unit to detection of absence of the original sheet on the original table, a storing-transmitting process in which the controller causes the storage to store multiple pieces of image data respectively corresponding to multiple numbers of original sheets in a scanned order, and causes the communication unit to transmit the image data to the external processing device in the scanned order, and a printing start instructing process in which the controller instructs the printer to start printing each of the multiple pieces of image data stored in the storage. The controller executes, in the copying process, a first print termination instruction process to instruct the printer to terminate printing when the printer has completed printing the number of copies set in the number of copy setting process of the image data having multiple pages and stored in the storage when a free capacity of a storage area of the storage is not lower than a threshold value within the particular period. When the free capacity of a storage area of the storage is lower than the threshold value within the particular period, the controller executes a first deletion process in which the controller deletes multiple pieces of image data stored in the storage on completion of printing the images represented by the multiple pieces of image data, respectively, a transmission instruction process in which the controller instructs the external processing device to transmit multiple pieces of image data to the storage via the communication unit after execution of the first deletion process, a second print termination instruction process in which the controller instructs the printer to terminate printing when the number of copies, which was set in the number of copy setting process, of images represented by the image data stored in the storage have been printed, and a second deletion process in which the controller deletes the multiple pieces of image data stored in the storage one by one upon completion of printing of each of the multiple pieces of image data by the printer in parallel with the second print termination instruction process.

According to aspects of the disclosures, there is also provided a copying machine, provided with a scanner configured to scan an image formed on an original sheet and generate image data, a storage configured to store the image data generated by the scanner, a printer configured to print an images on a printing sheet based on the image data stored in the storage, a communication unit configured to communicate with an external processing device, a light transmitting member on which the original sheet is to be placed, a moving unit configured to move the scanner in a moving direction which extends along the light transmitting member, an instruction obtaining unit, and a controller. The controller is configured to execute a copying process which includes a number of copy setting process in which the controller receives a user input of a number of copies to be printed, a scanning process in which the controller causes the scanner to scan images on the original sheets for a particular period from receipt of an instruction indicating that the original sheet is the last original sheet through the instruction obtaining unit, a storing-transmitting process in which the controller causes the storage to store multiple pieces of image data respectively corresponding to multiple numbers of original sheets in a scanned order, and causes the communication unit to transmit the image data to the external processing device in the scanned order, and a printing start instructing process in which the controller instructs the printer to start printing each of the multiple pieces of image data stored in the storage. The controller is further configured to execute, in the copying process, a first print termination instruction process to instruct the printer to terminate printing when the printer has completed printing the number of copies set in the number of copy setting process of the image data having multiple pages and stored in the storage when a free capacity of a storage area of the storage is not lower than a threshold value within the particular period. When the free capacity of a storage area of the storage is lower than the threshold value within the particular period, the controller executes a first deletion process in which the controller deletes multiple pieces of image data stored in the storage on completion of printing the images represented by the multiple pieces of image data, respectively, a transmission instruction process in which the controller instructs the external processing device to transmit multiple pieces of image data to the storage via the communication unit after execution of the first deletion process, a second print termination instruction process in which the controller instructs the printer to terminate printing when the number of copies, which was set in the number of copy setting process, of images represented by the image data stored in the storage have been printed, and a second deletion process in which the controller deletes the multiple pieces of image data stored in the storage one by one upon completion of printing of each of the multiple pieces of image data by the printer in parallel with the second print termination instruction process.

It is noted that the technique disclosed in this specification and drawings can be embodied in various ways. For example, the technique may be employed in a copy controlling method of a copying machine, in a printer configured to execute printing based in image data received from an external device, in a method of controlling a printing device and a copying machine, a computer program realizing the method/devices described above, and a non-transitory computer-readable medium storing such a program.

BRIEF DESCRIPTION OF THE ACCOMPANYING DRAWINGS

FIG. 1 schematically shows a configuration of a copying machine of a first illustrative embodiment according to aspects of the disclosures.

DETAILED DESCRIPTION OF THE EMBODIMENTS

Hereinafter, a configuration of a copying machine 100 according to a first illustrative embodiment of the disclosures will be described, referring to FIGS. 1-14. In the following description, as shown in FIG. 1, a closer side with respect to a plane of FIG. 1 will be referred to as a front side F of the copying machine 100, a right-hand side in FIG. 1 (i.e., a right-hand side when the copying machine 100 is viewed from the front side) will be referred to as a right side R of the copying machine 100, and an upside in FIG. 1 is an upside U of the copying machine 100.

Figure 1:
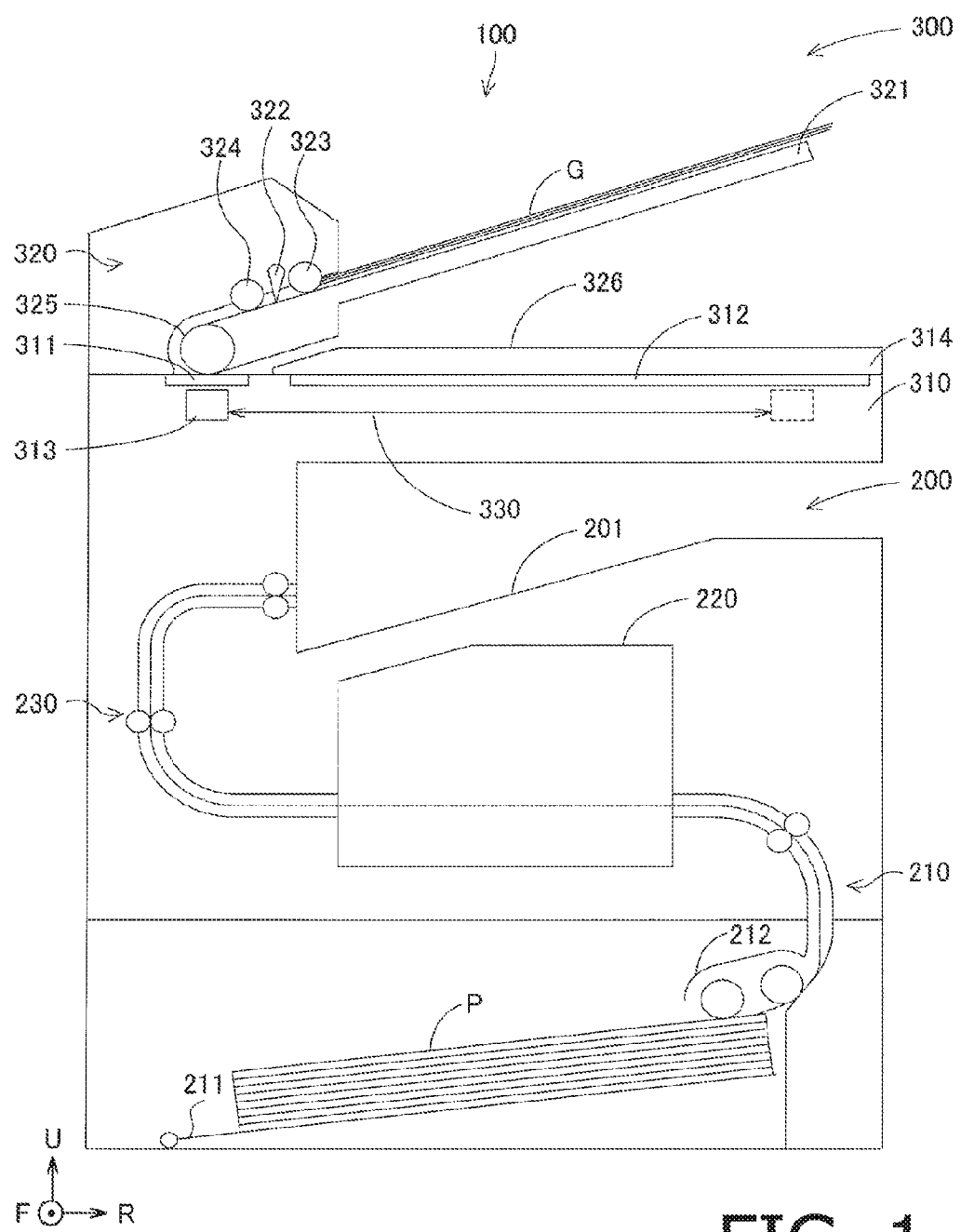

As shown in FIG. 1, the copying machine 100 has a printer 200, and a scanner 300 which is arranged above the printer 200. The printer 200 is configured such that a discharged sheet holder 201 is formed on an upper surface thereof, and accommodates a sheet supplier 210, a printing device 220, and a sheet discharging device 230. The sheet supplier 210 has an accommodation tray 211 capable of accommodating multiple printing sheets P, and a sheet separator 212 which separates one printing sheet P out of the multiple printing sheets P and feeds the separated printing sheet P toward the printing device 220.

The printing device 220 is configured, for example, to print images on a printing sheet P supplied from the sheet supplier 210 with black, yellow, magenta and cyan color agents in accordance with an electrophotographic image forming method or an inkjet printing method to apply the respective color agents on the printing sheet P. The sheet discharging device 230 discharges the printing sheet P on which the image has been formed by the printing device 220 on the discharged sheet holder 201.

The scanner 200 has a scanning device 210, and an ADF (which is an abbreviation of a automatic document feeder) 320. The scanning device 310 has a first reading table 311, a second reading table 312, an image reading element 313, and an original cover 314. The first reading table 311 and the second reading table 312 are made of transparent glass plates, respectively. The image reading element 313 includes a CIS (contact image sensor) or a CCD (charge coupled device) which is arranged to be movable within a space below the first reading table 311 and the second reading table 312. The original cover 314 is configured to cover/uncover an upper side of the first reading table 311 and the second reading table 312. It is noted that the second reading table 312 is an example of a light transmitting member set forth in claims.

The ADF 320 is provided to the original cover 314, and includes an original sensor 322, a feed roller 323, a separation roller 324, a conveying roller 325 and a discharged sheet table 326. On the original table 321, multiple sheets G of an original document (hereinafter, also referred to as original sheets G) can be placed. The original sensor 322 is configured to detect presence/absence of an original sheet G on the original table 321. The feed roller 323 introduces one original sheet G, which is separated, by the separation roller 324, from the multiple original sheets G on the original table 321. The conveying roller 325 conveys the thus introduced original sheet G to the discharged sheet table 326 via the upper surface of the first reading table 311. It is noted that the ADF is an example of an original sheet conveyer set forth in the claims.

The scanning device 310 is capable of scanning an image on the original sheet G using the ADF 320. In this case (i.e., when the ADF 320 is used for scanning), the image reading element 313 is located below the first reading table 311, and the image on the original sheet G, which is conveyed by the ADF 320 to pass over the first reading table 311, is scanned through the first reading table 311 without moving the image reading element 313.

Further, the scanning device 310 is also capable of scanning an image on the original sheet G which is placed on the upper surface of the second reading table 312 as a flatbed scanner. In this case, the image reading element 313 is driven to move in a direction indicated by arrowed line 330 in FIG. 1 with a driving unit 123, which will be described later, and the image on the original sheet G is scanned with the moving image reading element 313 through the second reading table 312, with keeping the original sheet G on the second reading table 312. It is noted that the driving unit 123 is an example of a movable scanner set forth in the claims.

The scanning device 310 scans, for example, each of red, green and blue color components of the image on the original sheet G, and generates image data D including four color components respectively corresponding to the four coloring agents of the printer. The scanning device 310 stores the generated image data D in a RAM (random access memory) 113 which will be described later.

Figure 2:
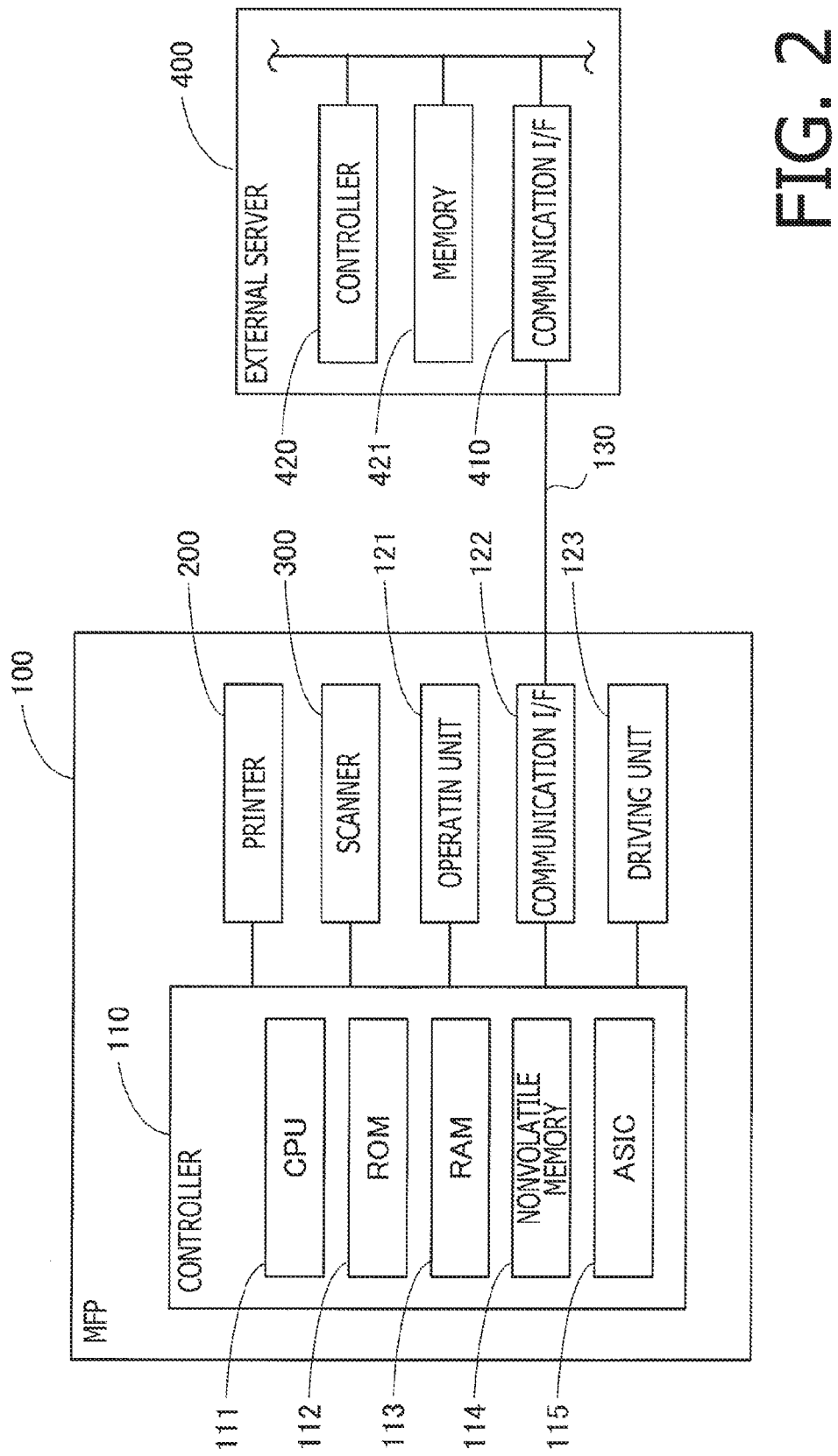
FIG. 2 is a block diagram illustrating an electrical configuration of the copying machine and an external server of the first illustrative embodiment according to aspects of the disclosures.

As shown in FIG. 2, the copying machine 100 has, in addition to the above mentioned printer 200, the scanner 300 and the driving unit 123, a controller 110 configured to control the copying machine 100, an operation unit 121 through which user operations are received, and a communication I/F (interface) 122 used to connect the copying machine 100 with an external device such as an external server 400.

The controller 110 has a CPU (central processing unit) 111, a ROM (read only memory) 112, the RAM (random access memory) 113, a nonvolatile memory 114, and an ASIC (application specific integrated circuit) 115. The ROM 112 stores control programs which, when executed, control operations of the copying machine 100. The ROM 112 also stores various setting items and initial/default values which are used when the programs are executed. The RAM 113 is used as a working area and/or a temporary storage area when the CPU 111 executes the programs. As mentioned above, the image data D generated by the scanning device 310 is also stored in the RAM 113. The non-volatile memory 114 may be an NVRAM (nonvolatile RAM), a flash memory, an HDD (hard disk drive), an EEPROM (electrically erasable programmable ROM) and the like, which retains stored data even if it is powered off, and data stored therein can be rewritten. The ASIC 115 is, for example, a hardware circuit dedicated particularly to an image processing. The CPU 111 controls respective components of the copying machine 100 in accordance with the programs retrieved from the ROM 112 and/or signals transmitted from the sensors. It is noted that the RAM 113 is an example of a storage and the CPU 111 is an example of a controller set forth in the claims.

The operation unit 121 is provided with various buttons and a touch panel (not shown in FIG. 2) for receiving the user's operation. The touch panel also serves as a displaying device which displays various pieces of information. The communication I/F 122 is a hardware that enables communication (e.g., transmission/reception of data) with an external server 400 and the like. For example, the communication interface 122 may be a network interface or the like. It is noted that the operation unit 121 is an example of an instruction obtaining unit, and the communication interface 122 is an example of a communication unit set forth in the claims.

The external server 400 includes a communication I/F (interface) 410 used to connect with the copying machine 100 and the like, a controller 420 controlling operations of the external server 400, and a memory 421 used as storage area for data. The external server 400 is an example of an external processing device set forth in the claims.

The communication I/F 410 is connected to the communication I/F 122 of the copying machine 130 via a network line 130. The controller 420 executes various processes (e.g., a process of storing the image data D received from the copying machine 100 in the memory 421, a process of transmitting the image data D stored in the memory 421 to the copying machine 100, a process of releasing the area of the memory 421 in which the image data D was stored) in accordance with instructions transmitted by the CPU 111 of the copying machine 100 and received through the communication I/F 410.

Next, referring to FIGS. 3-14, the copying process will be described in detail. The CPU 111 of the copying machine 100 executes the copying process shown in FIG. 3 when the CPU 111 receives a copying instruction, which is an instruction to copy the original sheet G, from the user through the operation unit 121 (i.e., an instruction to scan the image on the original sheet G, and an instruction to print a duplication of the original sheet G). It is noted that, according to the illustrative embodiment, when the user instructs copying, the user can also designate whether a sort-copying is to be done or not through the operation unit 121. The sort-copying is a process of causing the scanning device 310 to scan multiple original sheets G of the original document, and causing the printer 200 to print multiple copies of the original sheets G on one copy after another. In the following description, a case where the sort-copying is designated to be executed, and six original sheets G of the original document placed on the original table 321 are scanned with the scanning device 310 with use of the ADF 320, and three copies the original document (i.e., the six original sheets G) are printed with the printer unit 200 will be described. It is noted that the copying process described above is an example of a copying process set forth in the claims.

Figure 12:
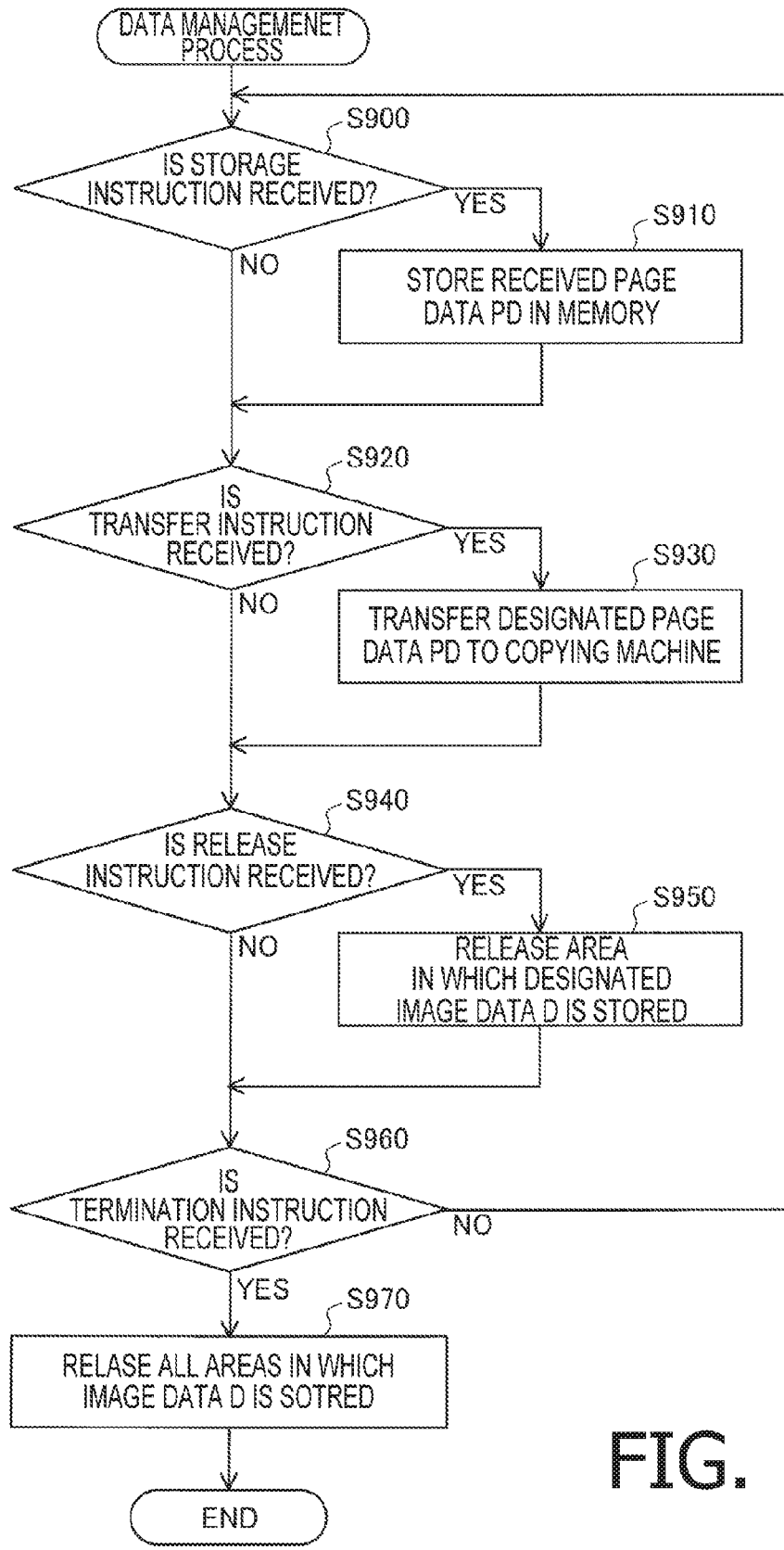
FIG. 12 is a flowchart illustrating a data management process executed in the external server of the first illustrative embodiment according to aspects of the disclosures.

When the copying process is started, the CPU 111 invokes the external server 400 via the communication interface 122 (S100). When the external server 400 is currently operating, the CPU 111 maintains the operating state of the external server. When the external server 400 is not operating (e.g., in a sleeping state), the CPU 111 causes the external server to change its state from the sleeping state to the operating state. When the external server 400 is invoked, the controller 420 executes a data management operation in which the controller 420 manages the image data D received from the copying machine 100 via the communication I/F 400. As shown in FIG. 12, when the data management process is started, the controller 420 stands by for receipt of one of a storing instruction, a transfer instruction, a release instruction and a termination instruction (S900: NO; S920: NO; S940: NO; S960: NO).

After invoking the external server 400, the CPU 111 sets the number of copies to three in accordance with the copying instruction by the user (S105). After setting the number of copies, the CPU 111 executes the scanning process (S110), the printing process (S120) and the job management process (S130) in parallel. In the scanning process, the CPU 111 conveys six original sheets G to the scanning device 310, causes the scanning device 310 to scan images on the six original sheets G and to generate the image data D, and to store the image data D in the RAM 113 (see FIG. 13).

Figure 4:
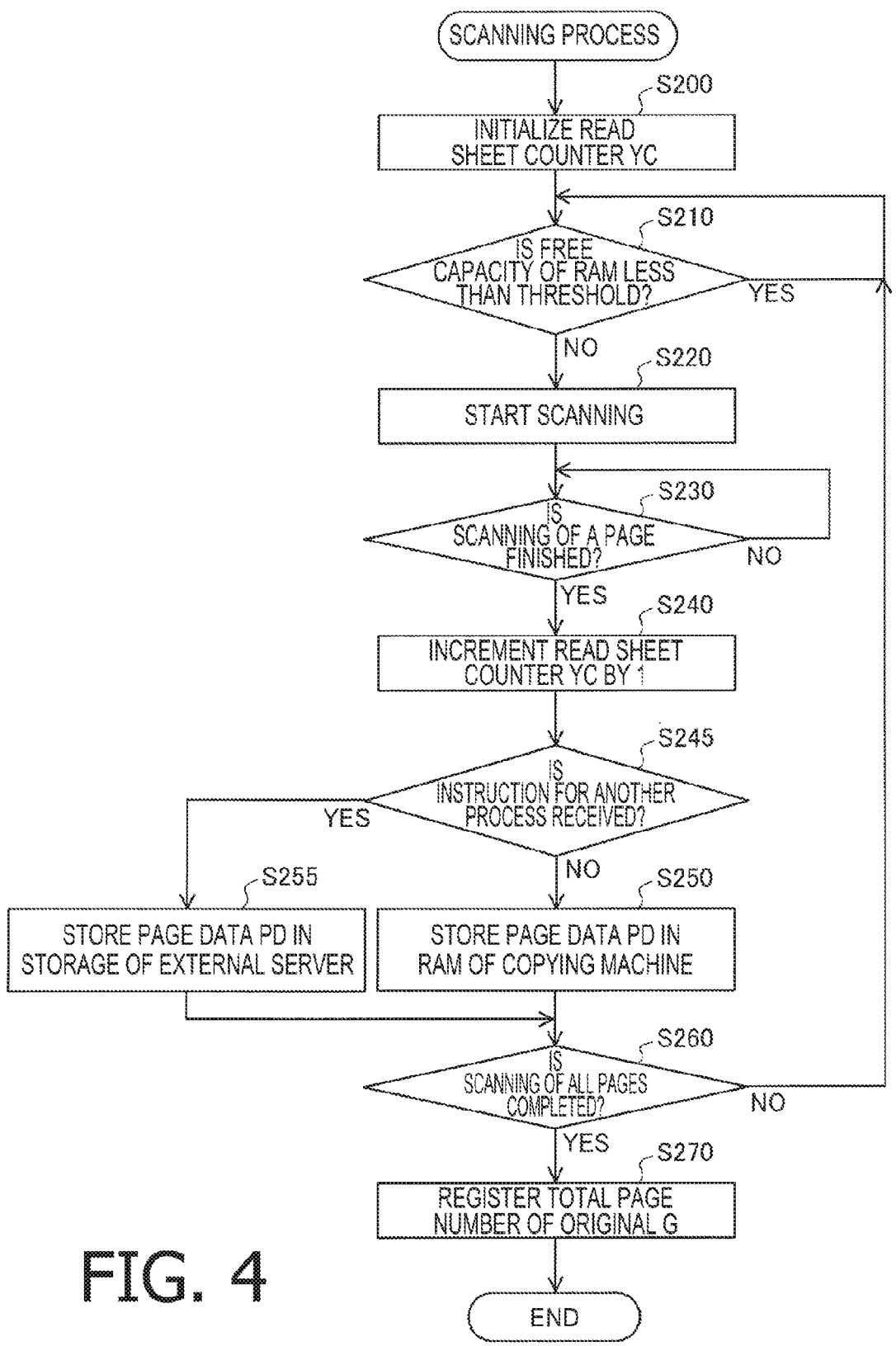
FIG. 4 is a flowchart illustrating a scanning process executed in the copying machine of the first illustrative embodiment according to aspects of the disclosures.

As shown in FIG. 4, when the scanning process is started, the CPU 111 initializes a read sheet counter YC indicating the number of scanned sheets to zero (S200). Then, the CPU 111 obtains a free capacity of the RAM 113 and determines whether the free capacity of the RAM 113 is less than a threshold value corresponding to a capacity for storing one page amount of image data D (hereinafter, referred to as page data D) (S210).

When the CPU 111 determines that the free capacity of the RAM 113 is less than the threshold value (S210: YES), the CPU 111 registers the fact that the free capacity of the RAM 113 is less than the threshold value, and stands by for an area capable of storing the page data PD being secured in the RAM 113 as the releasing process (see FIG. 10) is executed. When the CPU 111 does not determine that the free capacity of the RAM 113 is less than the threshold value (S210: NO), the CPU 111 causes the scanning device 310 to start scanning of the original sheets G (S220).

After the CPU 111 causes the scanning device 310 to start scanning the original sheets G, the CPU 111 waits for completion of each page (original sheet G) of the original document (S230: NO). When one original sheet G of the original document has been scanned and the page data PD is generated (S230: YES), the CPU 111 increments the read sheet counter YC by one (S240).

Figure 13:
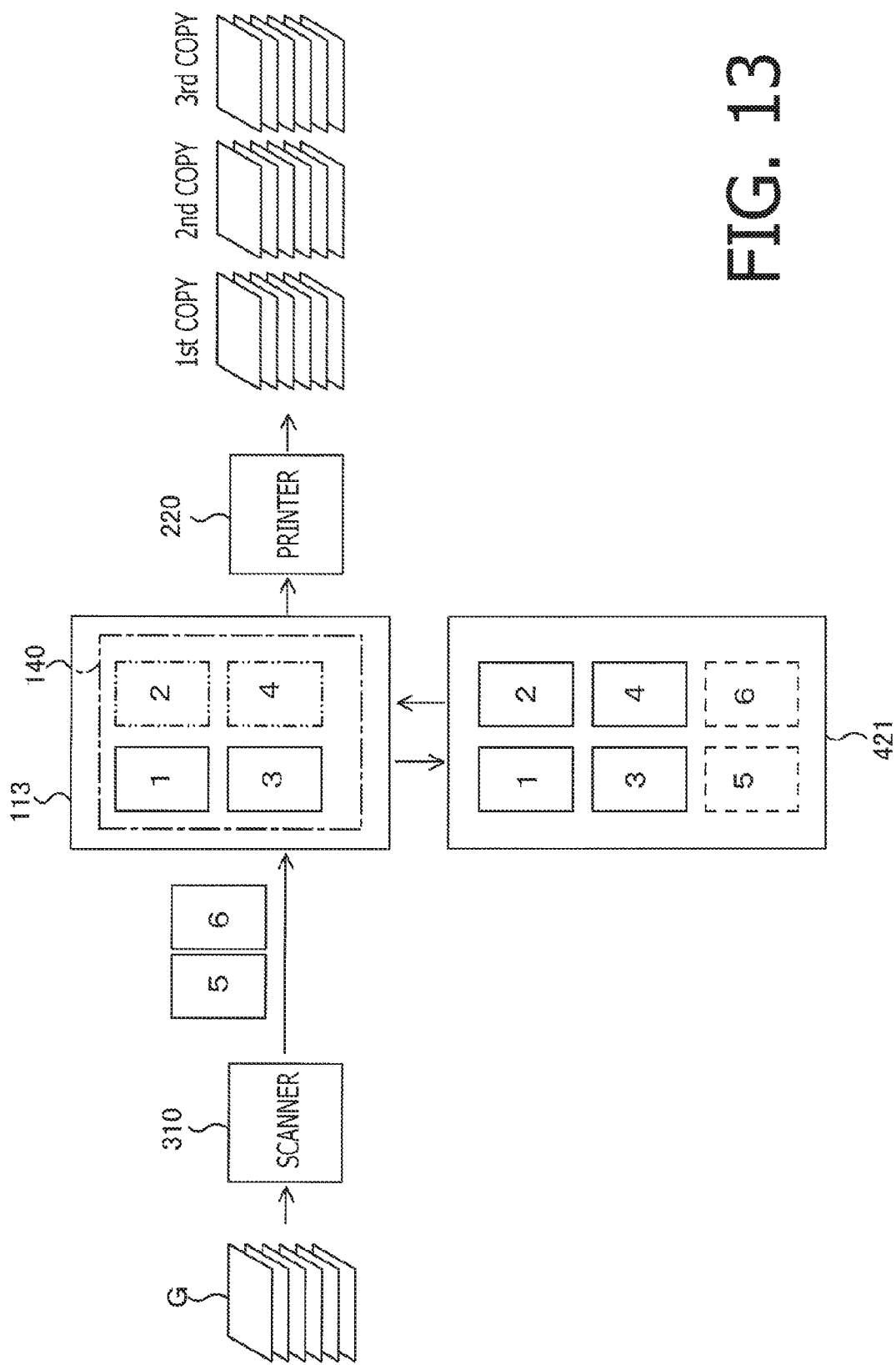
FIG. 13 is a chart illustrating flow of image data between a RAM of the copying machine and a memory of the external server of the first illustrative embodiment according to aspects of the disclosures.

In S245, the CPU 111 determines whether an instruction to execute another process has been received, through the operation unit 121, from the user when the scanning device 310 was reading the original sheets G. Another process here means a process requiring an area, which is different from the storage area 140 for the copying process, be secured in the RAM 113. Such a process is, for example, a process to transfer image data DA stored in the memory 421 of the external sever 400 to the RAM 113 of the copying machine 100 to cause the copying machine 100 to print the transferred image. When the CPU 111 does not detect the instruction to execute another process (S245: NO), the CPU 111 stores the page data PD as output in the RAM 113 in accordance with the scanned order (S250). It is assumed that, as shown in FIG. 13, according to the illustrative embodiment, the storage area 140 of the RAM 113 is capable of storing the page data PD for four pages of the original sheets G at a maximum.

When the CPU 111 detects that the instruction to execute another process (S245: YES), the CPU 111 does not store the page data PD in the RAM 113, but transmits the page data PD along with a storing instruction to store the page data PD, via the communication I/F 122, to the external server 400 (S255). Then, as shown in FIG. 12, the page data PD is stored only in the memory 421 of the external server 400 (S900: YES; S910).

Next, the CPU 111 determines whether scanning of all the pages (i.e., all the original sheets G) of the original document in S260 has completed. According to the illustrative embodiment, the CPU 111 detects whether the original sheet G is absent or present on the original table 321, and determines that all the original sheets G have been scanned when there is no original sheet remained on the original table 321 (i.e., when it is determined that the original sheet G is absent on the original table 321). When the CPU 111 detects that one or more original sheets G are remained on the original table 321 and determines that all the pages of the original sheets G have not been scanned (S260: NO), the CPU 111 returns to S210 and executes the steps therefrom again. When the CPU 111 detects that there is no original sheet G remained on the original table 321 and determines that all the pages of the original sheets G have been scanned (S260: YES), the CPU 111 registers the counted number of the read sheet counter YC with the RAM 113 as the number of pages of the original sheet G (S270), and terminates the scanning process.

As explained above, the number of original sheets G is assumed to be six for illustrating purpose. In the printing process, based on the image data D stored in the RAM 113, the CPU 111 causes the printing device 220 to print one copy of the original document by printing the six pages of original sheets G in the scanned order, and the CPU 111 causes the printing device 220 to print three copies of the original document (see FIG. 13).

Figure 5:
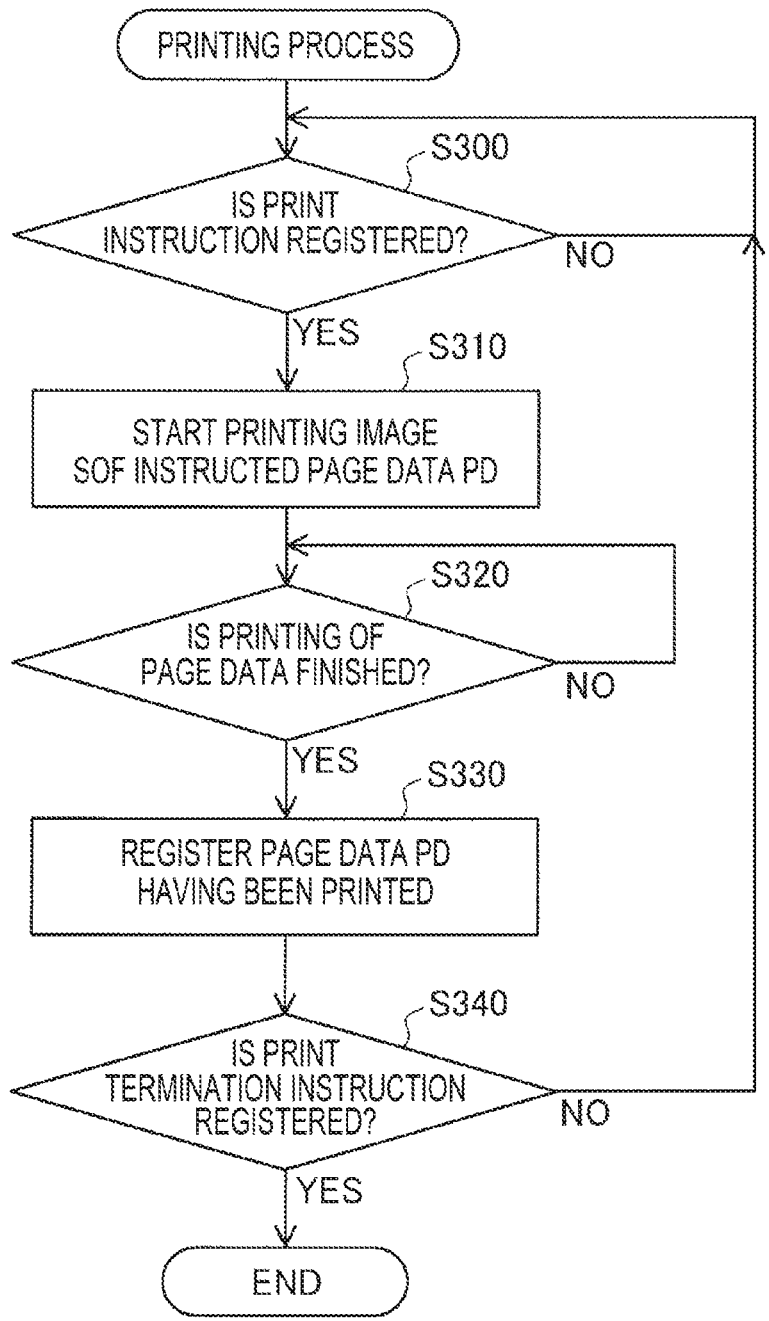
FIG. 5 is a flowchart illustrating a printing process executed in the copying machine of the first illustrative embodiment according to aspects of the disclosures.

As shown in FIG. 5, when the printing process is started, the CPU 111 waits for (S300: NO) registration of a print instruction in a print instruction process (see FIG. 11), which will be described later. The print instruction is registered for each piece of page data PD stored in the RAM 113. When the print instruction is registered (S300: YES), the CPU 111 instructs the printing device 220 to start printing, thereby causing the printing device 220 to retrieve the page data PD designated by the print instruction, in accordance with a registered order of the print instruction, from the RAM 113, and to start printing the image represented by the page data PD (S310).

After causing the printing device 220 to start printing the images represented by the image data D, the CPU 111 waits for completion of printing of the image represented by each piece of the page data PD (S320: NO). When the image represented by each piece of page data PD has been printed (S320: YES), the CPU 111 registers, with the RAM 113, a fact that the page data PD which is stored in the RAM 113 and is used for printing is the page data PD for which printing has been completed (S330).

Figure 6:
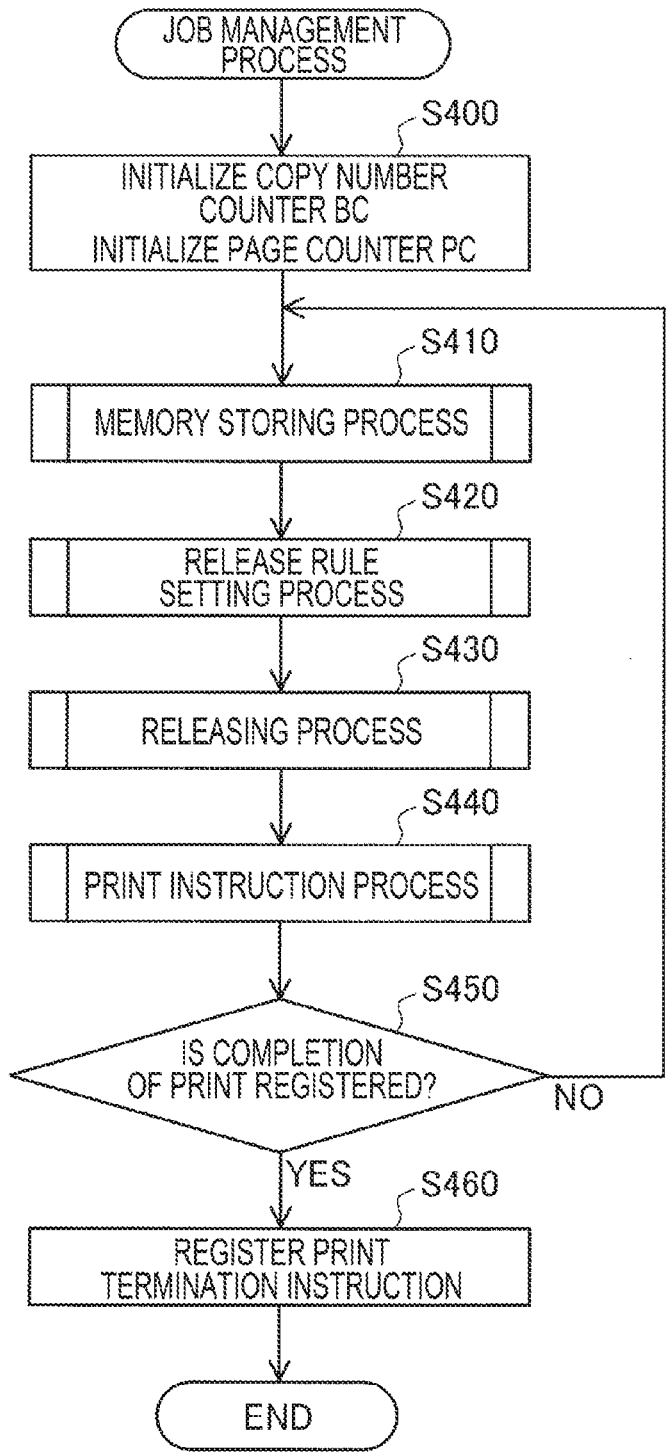
FIG. 6 is a flowchart illustrating a job management process executed in the copying machine of the first illustrative embodiment according to aspects of the disclosures.

In S340, the CPU 111 determines whether a print termination instruction has been registered by the job management process (see FIG. 6). When it is determined that the print termination instruction has not been registered (S340: NO), the CPU 111 returns to S300 and repeats the steps therefrom. When it is determined that the print termination instruction has been stored (S340: YES), the CPU 111 instructs the printing device 220 to stop printing, and terminates the printing process.

Next, the job management process will be described referring to FIG. 6. When the job management process is started, the CPU 111 initializes the number-of-copy counter BC indicating the number of copies to be made to one, and a page counter PC indicating a page number subject to the print instruction to one (S400). Then, the CPU 111 repeats a memory storing process (S410), a release rule setting process (S420), a releasing process (S430) and the print instruction process (S440) until completion of printing is registered in the print instruction process.

It is noted that a time period for executing the memory storing process, the release rule setting process, the releasing process and the print instruction process once is very short in comparison with a time period for scanning one original sheet G of the original document, or a reference printing time PT representing a time period necessary for printing an image of one piece of page data PD in the printing process. Therefore, the CPU 111 executes the above four processes (i.e., the memory storing process, the release rule setting process, the releasing process and the print instruction process) repeatedly by multiple times during scanning of one page of the original sheet G, and during printing of one page of image.

Next, the four processes (i.e., the memory storing process, the release rule setting process, the releasing process and the print instruction process) will be described in detail.

Figure 7:
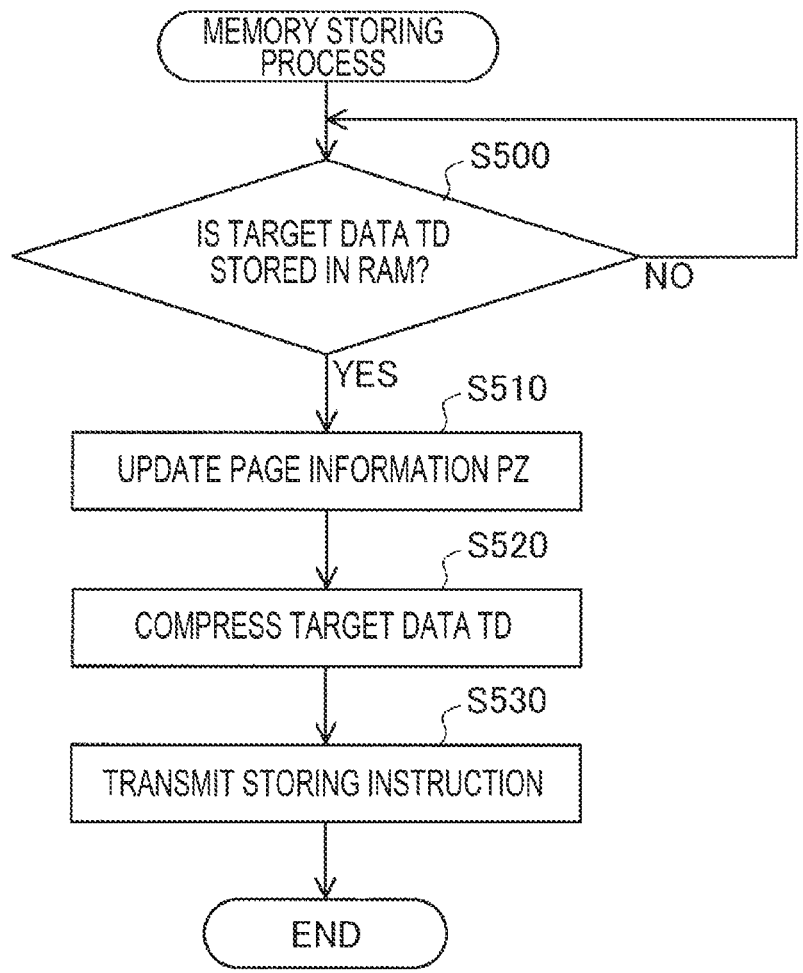
FIG. 7 is a flowchart illustrating a memory storing process executed in the copying machine of the first illustrative embodiment according to aspects of the disclosures.

In the memory storing process, the CPU 111 transmits the image data D to the external server 400 via the communication I/F 122 and causes the external server 400 to store the transmitted image data D in the memory 421 of the external server 400. Transmission and storing the image data D are executed in accordance with the order of scanning the multiple original sheets G (see FIG. 13). That is, as shown in FIG. 7, when the memory storing process is started, the CPU 111 determines whether a piece of page data PD which is not stored in the memory 421 of the external server 400 (hereinafter, such page data PD will also be referred to as target data TD) is stored in the RAM 113 of the copying machine 100 (S500).

When the CPU 111 determines that the target data TD is not stored in the RAM 113 (S500: NO), the CPU 111 terminates the memory storing process. When it is determined that the target data TD is stored in the RAM 113 (S500: NO), the CPU 111 updates page information PZ which is information relating to the page data PD stored in the RAM 113 (S510), and the page information PZ is updated to represent a fact that the target data TD is stored in the RAM 113.

The CPU 111 compresses the target data TD (S520) and transmits the compressed target data TD together with a storing instruction instructing to store the compressed target data TD to the external server 400 via the communication I/F 122, and terminates the memory storing process. By executing the memory storing process, the target data TD stored in the RAM 113 of the copying machine 100 is compressed so that the compressed target data TD has a smaller size than the uncompressed target data TD. As shown in FIG. 12, the controller 420 stores the compressed target data TD in the memory 421 of the external server 400 (S900: YES, S910).

As described above, the memory storing process is executed by multiple times during scanning of one original sheet G. Therefore, the image data D of the original sheets G is stored in the memory 421 of the external server 400 in the scanned order, every time the target data TD is stored in the RAM 113 of the copying machine 100. It is noted that the memory storing process is executed for each page data PD, and in the scanner 300, the image data D which does not have data of the entire page is not subject to the memory storing process.

Figure 8:
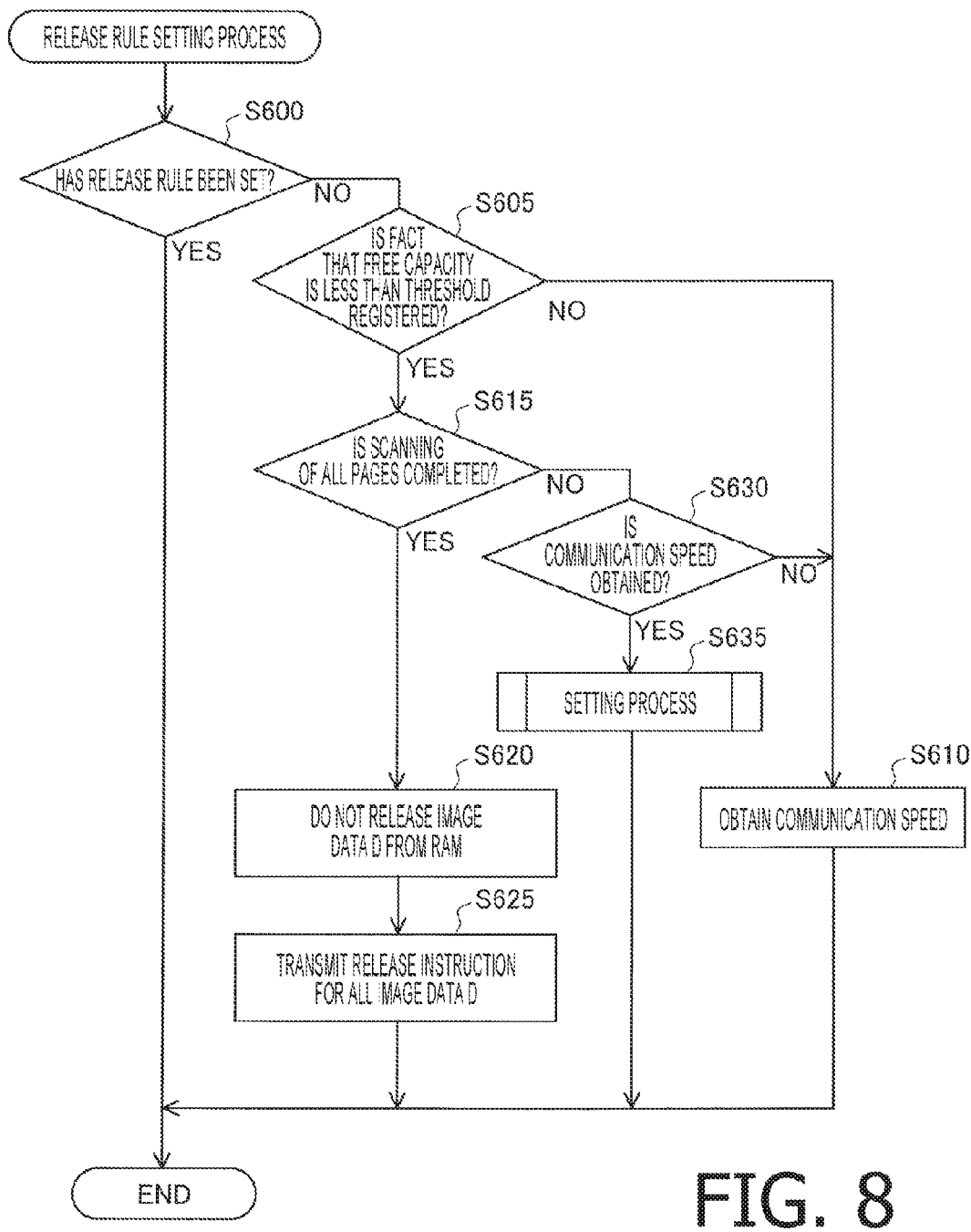
FIG. 8 is a flowchart illustrating a release rule setting process executed in the copying machine of the first illustrative embodiment according to aspects of the disclosures.

Next, the release rule setting process will be described. In the release rule setting process, the CPU 111 sets a release rule which is applied to release an area of the RAM 113 in which the image data D is stored. Specifically, as shown in FIG. 8, when the release rule setting process is started, the CPU 111 determines whether the release rule has been set (S600). When it is determined that the release rule has been set (S600: YES), the CPU 111 terminates the release rule setting process. When it is determined that the release rule has not been set (S600: NO), the CPU 111 determines whether a fact that a free capacity of the RAM 113 is less than the threshold value has already been stored (S605)

When it is determined that the fact that the free capacity of the RAM 113 is less than the threshold value has not been registered (S605: NO), the CPU 111 obtains the communication speed between the communication I/F 122 and the external server 400 (S610), and terminates the release rule setting process. When obtaining the communication speed, the CPU 111 uses, for example, a program such as a ping program stored in the ROM 112 to transmit a signal from the communication I/F 122 of the copying machine 100 to the communication I/F 410 of the external server 400. Based on a time interval from transmission of the signal and receipt, with the communication I/F 122, of a reply signal which is sent from the external sever 400 in response to the signal sent from the copying machine 100 to the external server 400, the CPU 111 obtains the communication speed between the communication I/F 122 and the external server 400.

When it is determined that the fact that the free capacity of the RAM 113 is less than the threshold has been registered (S605: YES), the CPU 111 determines whether scanning of all the pages of the original sheets G has been completed (S615). According to the illustrative embodiment, the CPU 111 determines whether scanning of all the pages of the original sheets G has completed based on whether all the page numbers of the original sheets have been registered.

When it is determined that scanning of all the pages of the original sheets G has been completed (S615: YES), that is, when the original sensor detects that absence of the original sheet G on the original table 321 after the scanning process and the printing process have been started and before it is detected that the fee capacity of the RAM 113 becomes less than the threshold, the CPU 111 sets a release rule not to release the area of the RAM 113 in which the image data D has been stored (S620). Because of this rule, the image data D stored in the RAM 113 during the scanning process is remained in the RAM 113 until printing of the last copy is finished. Thus, after the scanning process has been completed, the CPU 111 executes printing of three copies with use of the image data D stored in the RAM 113 during the scanning process.

According to the illustrative embodiment, the CPU 111 firstly receives an instruction to execute scanning of the original sheets G from the user via the operation unit 121. Then, before the original sensor 322 detects absence of the original sheet G on the original table 321, as far as the free capacity of the RAM 113 does not become less than the threshold value, the CPU 111 instructs the printing device 220 to stop printing after the printing part 220 has complete printing of three copies based on the six-page image data D stored in the RAM 113.

Further, the CPU 111 transmits a release instruction of all the image data D of the original sheets G to the external server 400 via the communication I/F 122, and terminates the release rule setting process. With this control, as shown in FIG. 12, the controller 420 releases all the areas of the memory 421, in which areas the image data D of the original sheets G have been stored (S940: YES, S950).

As described above, the release rule setting process is executed multiple times during printing of the images represented by the page data PD. Therefore, the release instruction should be transmitted during printing of the image of the last page of the first copy at the latest. Further, a time period necessary for releasing the area of the memory 421 is relatively short in comparison with a time period necessary for printing an image of the page data PD in the printing process. Because of this, the area of the memory 421 is released during printing of the last page of the second copy at the latest, that is, before start of printing of the last copy.

When it is determined that scanning of all the pages has not been completed (S615: NO), that is, when it is detected that the free capacity of the RAM 113 becomes less than the threshold value before the original sensor 323 detects absence of the original sheet G on the original table 321, the CPU 111 determines whether the communication speed has been obtained (S630). That is, when the free space of the RAM 113 becomes less than the threshold value during a period from receipt of the user instruction to execute scanning of the original sheet via the operation unit 121 to detection of absence of the original sheet G on the original table 321 by the original sensor 322, the CPU 111 determines whether the communication speed has been obtained (S630).

When it is determined that the communication speed has not been obtained (S630: NO), the CPU 111 obtains the communication speed between the communication I/F 122 and the external server 400 (S610), and terminates the release rule setting process. When it is determined that the communication speed has been obtained (S630: YES), the CPU 111 executes the setting process (S635).

In the setting process, the release rule to release the areas where the image data D has been stored is stored, and in the releasing process (see FIG. 10), the areas of the RAM 113 in which the image data D has been stored is released before printing of the last copy is started. Accordingly, it could be said that, to execute the setting process is to terminate a process of maintaining the image data D stored in the RAM 113 in the memory storing process before the start of printing the last copy, and to start a process of releasing the areas of the RAM 113 where the image data D has been stored before start of printing the last copy.

Figure 9:
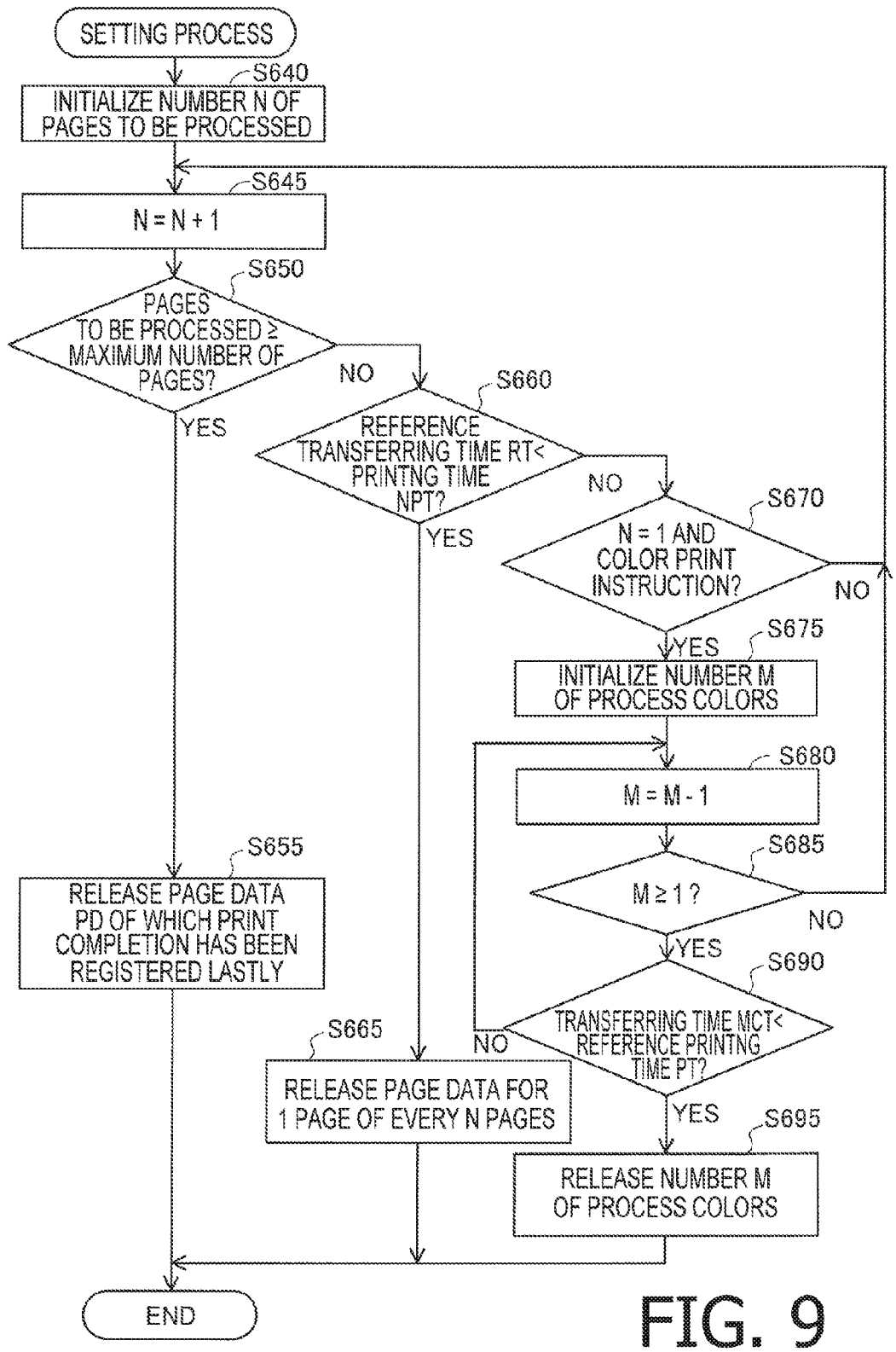
FIG. 9 is a flowchart illustrating a setting process executed in the copying machine of the first illustrative embodiment according to aspects of the disclosures.

As shown in FIG. 9, the CPU 111 initializes the number N of pages to be processed which is used to set the release rule based on the communication speed to zero in the setting process (S640). The CPU 111 increments the number N of pages to be processed by one (S645), and compares the incremented number N of page to be processed with the maximum number L of the pages available for the image data D in the RAM 113 (S650). The maximum number L can be obtained by dividing the capacity of the storage area 140 secured in the RAM 113 to store the image data D of the original sheets G by the threshold value. When the number N of pages to be processed is equal to or less than the maximum number L of the pages (S650: YES), the CPU 111 sets a release rule such that the area of the RAM 113 storing the page data PD for which print completion has just been registered is released (S655), and terminates the setting process and the release rule setting process.

As described above, the releasing process is executed multiple times during printing of the images of the page data PD. Therefore, according to the release rule, the areas of the RAM 113 in which the image data D is stored is released in the order of scanning, when printing of the image of the page data PD is completed.

When a printing time NPT is longer than the reference transferring time RT (S660: YES), the CPU 11 sets a release rule to release areas in which the page data PD is stored at a rate of one page for every N pages of the page data PD for which completion of printing has been registered (S665), and terminates the setting process and the release rule setting process.

According to the above release rule, when, for example, the number N of pages to be processed is one, that is, when the reference printing time PT is longer than the reference transferring time RT, with use of a specific speed which is obtained by dividing the threshold value with the reference printing time PT, the areas of the RAM 113 storing page data PD of which print completion has been registered is released with all the pages of the image data D corresponding to the six pages of original sheets G being target data, and with all color data of each of four colors being target data.

It is noted that "the case where the reference printing time PT is longer than the reference transferring time RT" could be expressed such that "a case where the communication speed is faster than a specific speed" using the "specific speed" which is defined as a speed obtained by dividing the threshold value by the reference printing time PT.

When the number N of pages to be processed is two or more, that is, when the communication speed is equal to or less than the specific speed, an area of the RAM 113 where the page data PD of which print completion has been registered is released with one of every N pages of the page data PD of the image data D for six pages corresponding to the original sheets G being the target. FIG. 13 shows an example in which the number N of pages to be processed is two, and page data PD of an even-number page is released.

When the printing time NPT is equal to or less than the reference transferring time RT (S660: NO), that is, when the communication speed is equal to or less than the specific speed, the CPU 111 determines whether the number N of pages to be processed is one, and further determines whether the color setting instructed with the copying instruction by the user is a color printing instruction instructing to print an image using multiple-color coloring agents (S670). When it is determined that the number N of pages to be processed is not one, or the color setting instructed with the copying instruction is a monochromatic print instruction instructing to print an image with a single-color coloring agent (S670: NO), the CPU 111 repeats steps from S645.

When it is determined that the number N of pages to be processed is one, and the color setting instructed with the copying instruction is the color print instruction (S670:

YES), the CPU 111 initializes the number M of process colors for setting the release rule based on the communication speed to four which is the number of coloring agents used in the printer 200 (S675). The CPU 111 decrements the number M of the process colors by one (S680), and compares the decremented number M of the processes with one (S685). When the number M of the process colors is zero (S685: NO), the CPU 111 repeats steps from S645.

When the number M of the process colors is one or greater (S685: YES), the CPU 111 compares the reference printing time PT with a transferring time MCT (S690). The transferring time MCT is a time period necessary for transmitting color data for number M of process colors from the memory 421 of the external memory 421 to the RAM 113 of the copying machine 100. It is noted that the transferring time MCT can be calculated as follows:

$$MCT = CT \times M,$$

where, CT is a reference color transferring time which is obtained by dividing the reference transferring time RT by the number "4" of the coloring agents used in the printer 200.

The CPU 111 repeats steps from S680 when the reference printing time PT is equal to or less than the transferring time MCT (S690: NO). When the reference printing time PT is longer than the transferring time MCT (S690: YES), the CPU 111 sets a release rule to release the area in which the color data corresponding to the number M of process colors is stored for each piece of page data PD among the page data PD of which print completion has been registered (S695), and terminates the release rule setting process.

Figure 10:
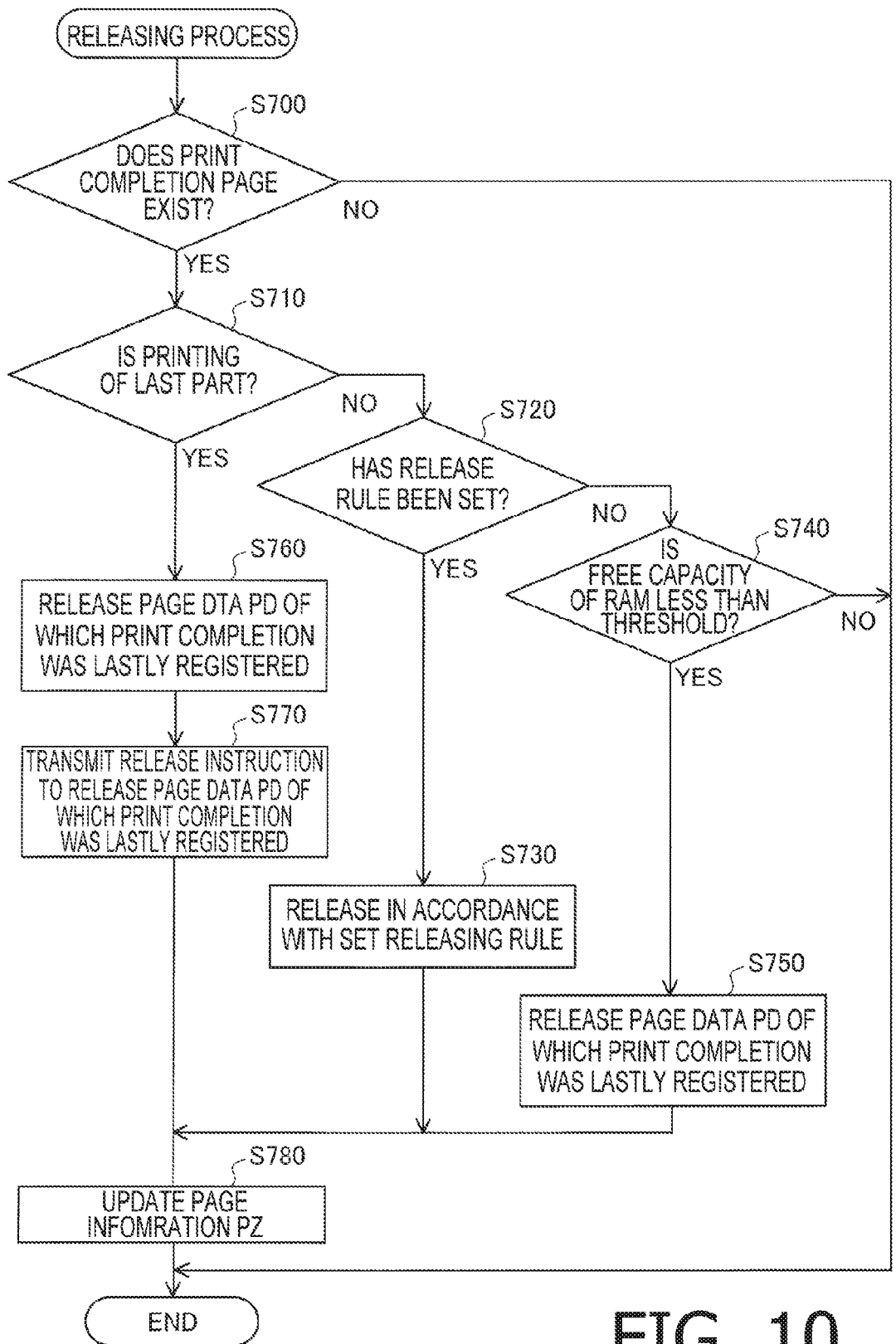
FIG. 10 is a flowchart illustrating a releasing process executed in the copying machine of the first illustrative embodiment according to aspects of the disclosures.

According to the above release rule, when the communication speed is equal to or less than the specific speed, areas in which the page data PD of which print completion has been registered are released with part of the four colors of the color data being target data in the releasing process (see FIG. 10).

Next, the releasing process will be described. In the releasing process, the CPU 111 releases the area of the RAM 113 storing the page data PD of which print completion has been registered, that is the area storing the image data D which has already been printed in the printing process. According to the illustrative embodiment, as shown in FIG. 10, when the releasing process is started, the CPU 111 determines whether there is page data PD of which print completion has been registered.

When it is determined that there is no page data PD of which print completion has been registered (S700: NO), the CPU 111 terminates the releasing process. When it is determined that there is page data PD of which print completion has been registered (S700: YES), the CPU 111 determines whether a currently executing printing is printing of the last copy (S710). According to the illustrative embodiment, the CPU 111 determines whether the currently executed printing is printing of the last copy based on whether the copy counter BC indicates "3" or not.

When it is determined that the currently executed printing is not printing of the last copy (S710: NO), the CPU 111 determines whether the release rule has already been set in the release rule setting process (S720). When it is determined that the release rule has already been set (S720: YES), the CPU 111 releases the area storing the page data PD of which print completion has been registered in accordance with the set release rule (S730).

When it is determined that the release rule has not been set (S720: NO), the CPU 111 obtains the free capacity of the RAM 113 and determines whether the free capacity of the RAM 113 is less than the threshold value (S740). When it is determined that the free capacity of the RAM 113 is less than the threshold value (S740: YES), the CPU 111 releases the area of the RAM 113 storing the page data PD of which print completion has been registered lastly (S750). With this control, even before the release rule is set, the CPU 111 is capable of releasing an area of the RAM 113 storing the image data D. When it is determined that the free capacity of the RAM 113 is not less than the threshold (S740: NO), the CPU 111 terminates the releasing process.

When it is determined that the currently printed copy is the last copy (S710: NO), the CPU 111 releases the area of the RAM 113, in which area the lastly registered page data PD is stored (S760). Further, the CPU 111 transmits, via the communication I/F 122, a release instruction instructing the external sever 400 to release the lastly registered page data PD (S770). With this control, the controller 420 releases the page data PD designated by the release instruction in the memory 421 as shown in FIG. 12 (S940: YES, S950). Thus, printing of the last copy is completed, and the image data D, which has become unnecessary, is deleted for each page data PD from the RAM 113 of the copying machine 100 and the memory 421 of the external server 400. Thereafter, the CPU 111 updates the page information PZ according to the release of the area (S780), and terminates the releasing process.

As described above, the releasing process is executed multiple times during printing of the page data PD. Therefore, in the releasing process, the CPU 111 releases the areas of the RAM 113 storing the page data PD of which print completion has been registered, in the scanned order or in the order according to the set rule at every time an image represented by the page data PD has been printed, thereby deleting the image data D stored in the RAM 113 in turn.

Figure 11:
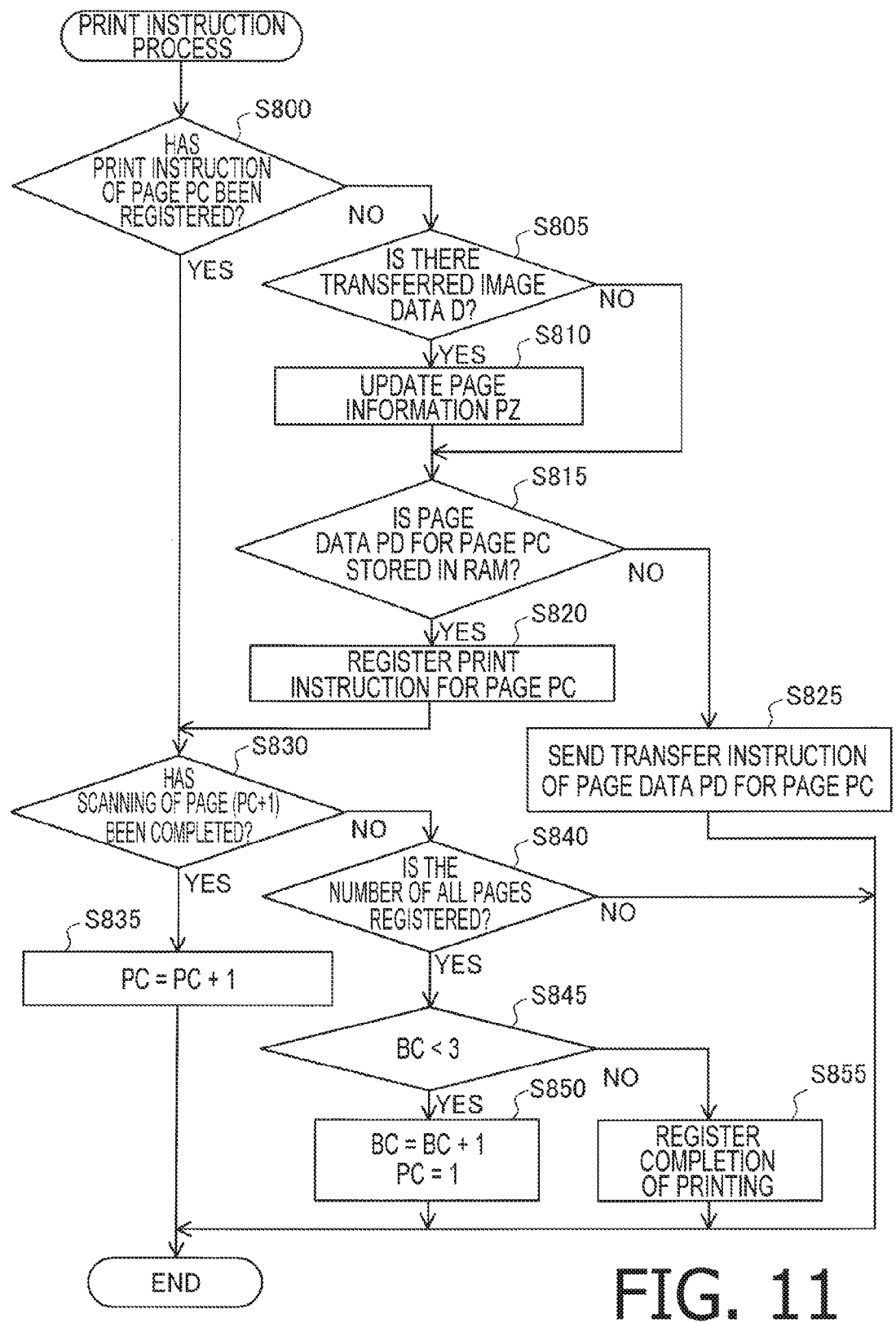
FIG. 11 is a flowchart illustrating a print instruction process executed in the copying machine of the first illustrative embodiment according to aspects of the disclosures.

Next, the print instruction process will be described. In the print instruction process, the CPU 111 registers the print instructions in the scanned order according to the image data D stored in the RAM 113. Further, in the print instruction process, the CPU 111 instructs transmission of the image data D, via the communication I/F 122, from the external server 400 to the RAM 113 in turn. Specifically, the CPU 111 causes the communication I/F 122 to obtain the image data stored in the memory 421 of the external server 400 in the scanned order, and causes the RAM 113 of the copying machine 100 to store the thus obtained image data D. According to the illustrative embodiment, as shown in FIG. 11, when the print instruction process is started, the CPU 111 determines whether a print instruction to print a page indicated by the page counter PC (hereinafter, a page indicated by the page counter is referred to as a page PC) has been registered.

When it is determined that the print instruction for the page PC has not been registered (S800: NO), the CPU 111 determines whether there is image data D which has been transmitted from the external sever 400 to the RAM 113 during a period from the previous print instruction process to the current print instruction process (S805). When there is such image data D transmitted from the external server 400 (S805: YES), the CPU 111 updates the page information PZ associated with the transmission (S810). When it is determined that no image data D has been transferred (S805: NO), or the page information PZ associated with the transfer has already been updated (S810), the CPU 111 determines whether the page data PD of the page PC is stored in the mar 113 (S815).

For example, when the image data D stored in the RAM 113 is not deleted in the releasing process, the page data D of the page PC is stored in the RAM 113. Even when the image data D stored in the RAM 113 has been deleted in the releasing process, when the scanning process is scanning the original sheets G, that is, when the original sensor 322 is detecting that the original sheets G are present on the original table 321, since the page data PD output by the scanning device 310 is stored in the RAM 113, the page data PD of the page PC is stored in the RAM 113. When the CPU 111 determines that the page data PD of the page PC is stored in the RAM 113 (S815: YES), the CPU 111 registers the print instruction for the page PC (S820).

In contrast, for example, even when the image data D, which was stored in the RAM 113 during the releasing process, has been deleted, when the original sensor 322 detects that the absence of the original sheet G on the original table 321, that is, when the scanning process is terminated, there is a case where the page data PD of the page PC is not stored in the RAM 113. When it is determined that the page data PD of the page PC is not stored in the RAM 113, the CPU 111 transmits a transfer instruction of the page data PD of the page PC to the external server 400 (S825), and terminates the print instruction process. With this control, as shown in FIG. 12, the controller 420 transmits the page data PD of the page PC designated by the transfer instruction to the copying machine 100 (S920: YES, S930). The transfer instruction is repeatedly transmitted until the print instruction corresponding to printing of the three copies of documents, and in the printing process, printing of three copies of documents is completed with use of the image data D, which is stored in the RAM 113 according to the transfer instruction.

When it is determined that the print instruction for the page PC has already been registered (S800: YES) or has just been registered (S820), the CPU 111 determines whether scanning of a page next to the page PC (hereinafter, the next page will be referred to as page (PC+1)) has been scanned (S830). It is noted that the CPU 111 determines whether scanning of the page (PC+1) has been completed based on whether the read sheet counter YC is greater than the page counter PC. When it is determined that scanning of the page (PC+1) has been completed (S830: YES), the CPU 111 increments the page counter PC by one (S835), and terminates the print instruction process.

When it is determined that scanning of the page (PC+1) has not been completed (S830: NO), the CPU 111 determines whether all the pages of the original sheets G have been registered (S840). When it is determined that all the pages of the original sheets G have not been registered (S840: NO), the CPU 111 terminates the print instruction process.

When it is determined that all the pages of the original sheets G have been registered (S840: YES), the CPU 111 detects that printing of the number represented by the number-of-copy counter BC of copies of the documents have been completed. According to the illustrative embodiment, the CPU 111 compares the number represented by the number-of-copy counter BC with "3" which is the number designated by the copy instruction (S845). When it is determined that the number represented by the number-of-copy counter BC is less than "3" (S845: NO), the CPU 111 increments the number-of-copy counter BC by one, and initializes the page counter PC to one (S850), and terminates the print instruction process. When the copy number counter represents "3" (S845: No), that is, printing of three copies documents using image data D corresponding to six pages of image data D has been completed, the CPU 111 registers print completion with RAM 111 (S855) and terminates the print instruction process.

Figure 3:
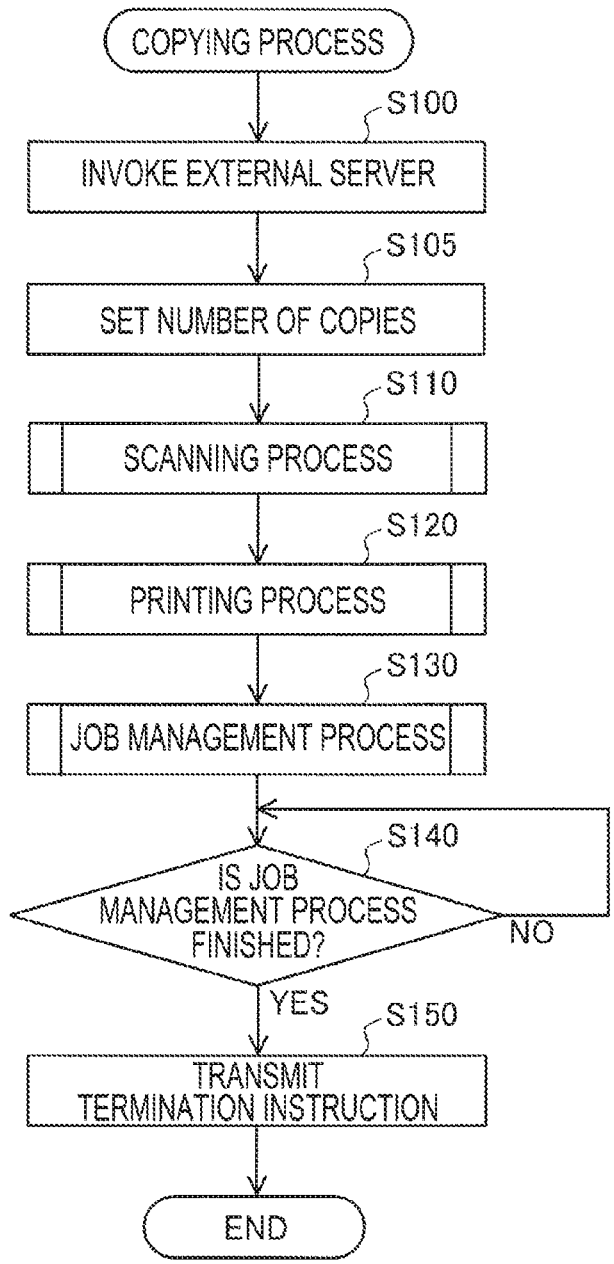
FIG. 3 is a flowchart illustrating a copying process executed in the copying machine of the first illustrative embodiment according to aspects of the disclosures.

As shown in FIG. 6, when print completion is registered with the RAM 113 in the print instruction process, the CPU 111 registers print completion instruction with the RAM 113 (S460), and terminates the job management process. As shown in FIG. 3, the CPU 111 is waiting for termination of the job management process in the copying process (S140: NO), and when the job management process is terminated (S140: YES), the CPU 111 transmits a completion instruction to the external server 400 via the communication I/F 122 (S150), and terminates the copying process. With the above control, the controller 420 releases all the areas of the memory 421 storing the image data D of the original sheets G (S960: YES, S970), and terminates the data management process.

As above, according to the illustrative embodiment, when the sort copying of the six sheets of original sheets G is executed, the CPU 111 prints images of the original sheets G using the image data D stored in the RAM 113 in the scanning process, or the image data D stored in the RAM 113 in accordance with the transferring instruction. That is, according to the illustrative embodiment, printing of the images of the original sheets G is always executed based on the image data D stored in the RAM 113. Accordingly, in comparison with a conventional copying machine, affection of variation of the communication speed between the copying machine 100 and the external server 400 is suppressed, and reduction of the number of printed sheets per unit time can be suppressed.

In the conventional copying machine, when it is detected that the free capacity of the RAM is less than the threshold value before the original sensor detects the absence of the original sheets on the original table, the image data output before it is detected that the free capacity of the RAM is less than the threshold value is stored in the RAM inside the copying machine, and the image data output after it is detected that the free capacity of the RAM is less than the threshold value is stored in the external server, which is outside the copying machine.

Figure 14:
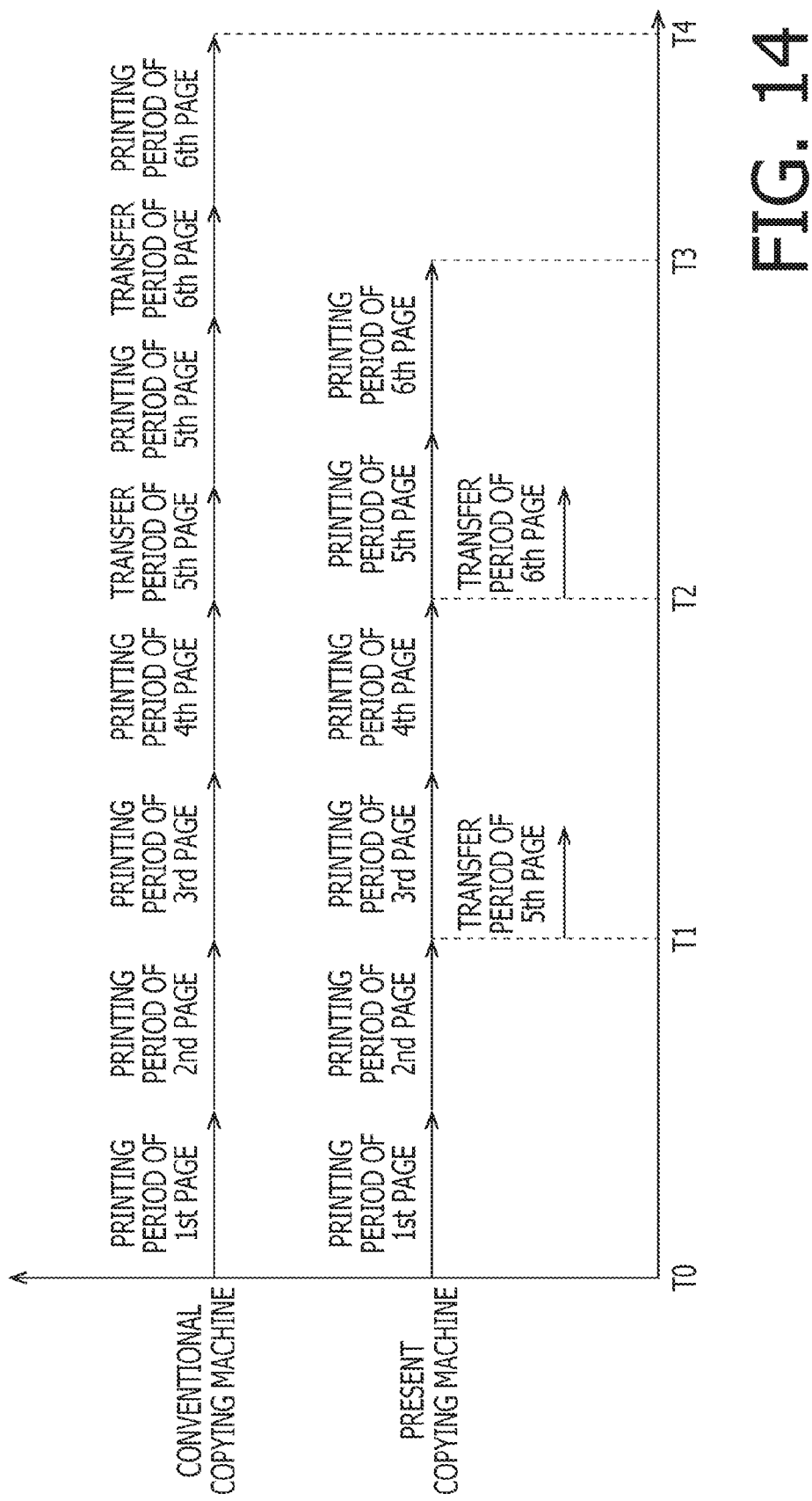
FIG. 14 is a timing chart illustrating time necessary for printing the image data according to the first illustrative embodiment aspects of the disclosures.

Regarding pages corresponding to the image data stored in the external server, in the conventional copying machine, printing was executed based on the image data stored in the external server without transferring the image data to the RAM. Therefore, as shown in FIG. 14, after the images represented by the image data stored in the RAM are printed (i.e., an image corresponding to the fourth original sheet has been printed), when images represented by the image data stored in the external server are started to be printed (i.e., when images corresponding to the fifth and sixth pages of the original sheets are started to be printed), a transfer period to transfer the image data stored in the external server to the copying machine is required. Since such a transfer period is affected by the communication speed between the copying machine and the external server, the number of printed sheets per unit time may be reduced in the conventional copying machine.

According to the illustrative embodiment, it is also necessary to transfer the image data D stored in the external server 400 to the RAM 113 when the image data D should be once transferred to the RAM 113 in accordance with the transferring instruction, and printing should be executed using the image data D transferred to the RAM 113. According to the illustrative embodiment, however, the releasing process to delete the image data D stored in the RAM 113 (S430) and the print instruction process to transmit the transferring instruction to transfer the image data D from the external server 400 to the RAM 113 (S440) are executed multiple times during printing of one page of image data D.

Accordingly, as shown in FIG. 14, it is possible to transfer the image data D stored in the external server 400 to the RAM 113 before the printing process using the same is started. That is, transferring of the image data D to be used for printing can be executed during printing of an image using the image data D which has already been stored in the RAM 113. In FIG. 14, when printing of six pages of image data is started at time T0, printing of the sixth page (i.e., printing of six pages) is completed at time T4 according to the conventional copying machine. In contrast, according to the illustrative embodiment, the image data area for the second page is released and transferring of the image data D for the fifth page starts at time T1, and printing of the third page starts. Similarly, the image data area for the fourth page is released and transferring of the image data D for the sixth page starts at time T2, and printing of the fifth page starts. Then, printing of the image data D for the six pages is completed at time T3. Thus, time period necessary to print six pages of images according to the illustrative embodiment is shorter than that of the conventional copying machine (i.e., T3<T4). According to the above configuration of the illustrative embodiment, influence of variation of the communication speed between the copying machine 100 and the external server 400 can be suppressed, and reduction of the number of printed sheets per unit time can be suppressed.

According to the illustrative embodiment, the CPU 111 compresses the image data D before transmitting the same to the external server 400 (S520) so that the size of the image data D stored in the memory 421 of the external server 400 is smaller than the size of the same image data D stored in the RAM 113 of the copying machine 100. With this configuration, in comparison with the case where the image data D stored in the RAM 113 is transmitted to the external server 400 without compressing the same, the size of the image data D transmitted between the communication I/F 122 and the external server 400 can be reduced, and thus, a time period necessary for transmitting/receiving the image data D between the communication I/F 122 and the external server 400 can be reduced.

According to the illustrative embodiment, the CPU 111 sets the release rule to release the areas of the RAM 113 where the image data is stored such that the area corresponding to one page for every N pages is released when the communication speed between the communication I/F 122 and the external server 400 is equal to or less than the specific speed (S660: YES, N≥2). According to this configuration, in comparison with a case where the release rule is set with all the pages being the target, the size of the image data D transmitted between the communication I/F 122 and the external server 400 can be reduced. As a result, the time period necessary to transmit the image data D between the communication I/F 122 and the external server 400 can be reduced.

Further, according to the illustrative embodiment, when the communication speed between the communication I/F 122 and the external server 400 is equal to or less than the specific speed (S670: YES), the CPU 111 sets the release rule to release the areas of the RAM 113 where the image data is stored with a part of color data among color data for multiple colors included in the image data D being the target. With this configuration, in comparison with a case where the release rule is set with all the color data being the target, the size of the image data transmitted between the communication I/F 122 and the external server 400 can be reduced. As a result, the time period necessary to transmit the image data D between the communication I/F 122 and the external server 400 can be reduced.

When the original sensor 322 detects that the original sheet G is absent on the original table 321 after it is detected that the free capacity of the RAM 113 is less than the threshold value (S605: YES, S615: YES), the CPU 111 transmits a release instruction to release the area of memory 421 of the external server 400 storing all the image data D (S625) so that the area is released before printing of the last copy is started. According to this configuration, in comparison with a case where the area of the memory 421 is released after printing of the last copy is started, the area of the memory 421 can be released earlier.

Further, according to the illustrative embodiment, when it is determined that an instruction to execute another process is received from the user via the operation unit 121 when the scanning device 310 is executing scanning of the original sheet G (S245: YES), the CPU 111 does not store, in the RAM 113, the image data D which is output after the CPU 111 receives such an instruction. Therefore, it is possible to suppress reduction of the free capacity of the RAM 113 which is usable in the other process.

Figure 15:
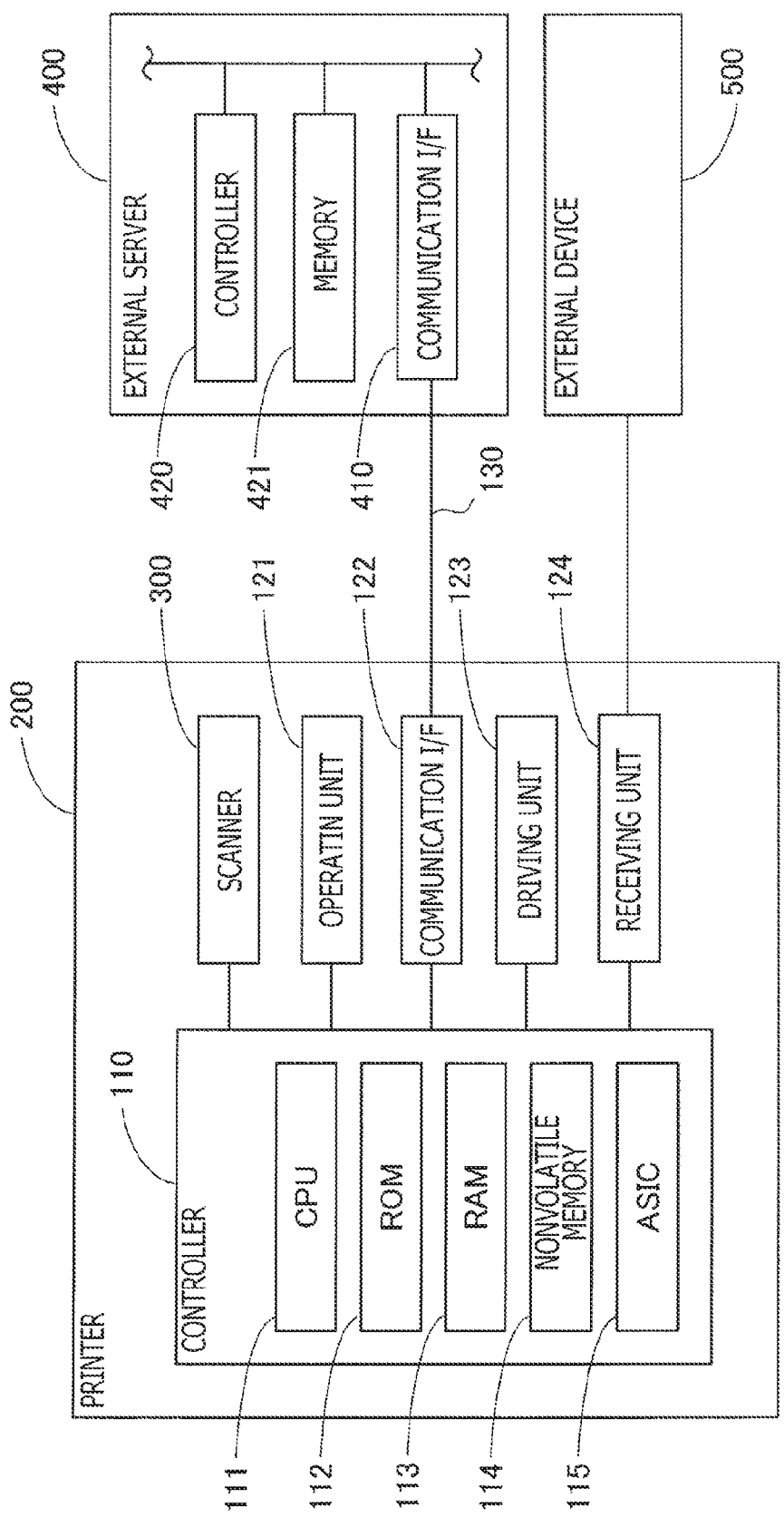
FIG. 15 is a block diagram illustrating an electrical configuration of a printer and an external server of a second illustrative embodiment according to aspects of the disclosures.
Figure 16:
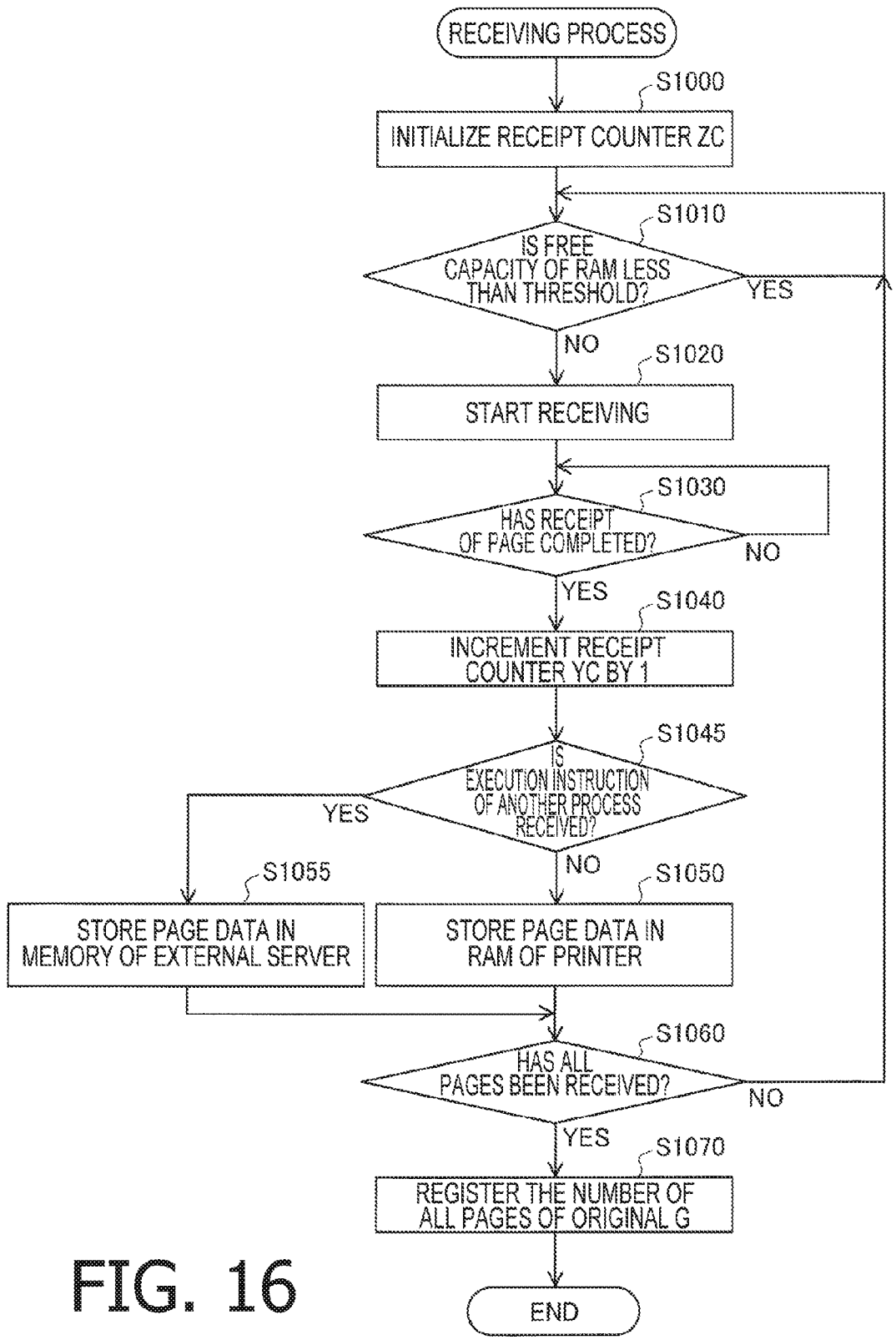
FIG. 16 is a flowchart illustrating a receiving process executed in the printer of the second illustrative embodiment according to aspects of the disclosures.

FIGS. 15 and 16 show a second illustrative embodiment according to the present disclosures. As shown in FIG. 15, the second illustrative embodiment is different from the previously described embodiment (i.e., a first illustrative embodiment) in that the second illustrative embodiment is a printer 200 which does not have a scanner 300, and a receiving unit 124 configured to receive image data D from an external device 500 such as a computer. The other configuration is similar to that of the first embodiment. Accordingly, in the following description, the components same as those of the first illustrative embodiment are assigned with the reference numerals same as those used for the first illustrative embodiment, and description thereof will be omitted for brevity. That is, in the following description, portions of the second illustrative embodiment different from those in the first illustrative embodiment will be described in detail.

The receiving unit 124 is hardware which enables receipt of the image data D from the external device 500. For example, the receiving unit 124 is a serial communication interface, a parallel communication interface or the like.

When the CPU 111 of the printer 200 receives a copying instruction of the original sheet G by the user through the operation unit 121, that is, when the CPU 111 receives instructions to receive the image data D, and to print an image represented by the image data D, the CPU 111 executes a copying process shown in FIG. 3. According to the second illustrative embodiment, instead of executing the scanning process in the copying process shown in FIG. 3, the CPU 111 executes a receiving process to receive the image data from the external device 500.

In the receiving process, the CPU 111 receives the image data D, which is transmitted from the external device 500, with the receiving unit 124. Multiple pieces of the image data D are stored in the RAM 113 in the received order. For example, as shown in FIG. 16, when the receiving process is started, the CPU 111 initializes a receipt counter ZC indicating the number of pages of the received image data D to zero "0" in S100. Then, the CPU 111 obtains the size of the free capacity of the RAM 113, and determines whether the free capacity of the RAM 113 is less than a threshold value which corresponds to the capacity necessary to store one page of the image data D (hereinafter, referred to as page data PD) (S1010).

When it is detected that the free capacity of the RAM 113 is less than the threshold value (S1010: YES), the CPU 111 registers the fact that the free capacity of the RAM 113 is less than the threshold value with the RAM 113, and awaits that an area in which the page data PD is stored is secured in the RAM 113 in the releasing process (see FIG. 10). When it is not detected that the free capacity of the RAM 113 is less than the threshold value (S1010: NO), the CPU 111 causes the receiving unit 124 to start receiving the image data D (S1020).

When the CPU 111 causes the receiving unit 124 to start receiving the image data, the CPU 111 awaits completion of receipt of the image data for each page (S1030: NO). When the page data PD has been received (S1030: YES), the CPU 111 increments the receipt counter ZC by one (S1040). While the receiving unit 124 is receiving the image data D, the CPU 111 determines whether an instruction for another process is received from the user via the operation unit 121 (S1045). When it is determined that such an instruction for another process is not received (S1045: NO), the CPU 111 stored multiple pieces of the received page data PD in the RAM 113 in the received order (S1050).

When it is determined that such an instruction to executed another process (S1045: YES), the CPU 111 does not store the received page data PD in the RAM 113 of the printer 200, but does transmit the received page data PD to the external server 400 together with a storing instruction, which instructs storage of the page data PD, via the communication interface 122 (S1055). With this configuration, the page data PD is stored only in the memory 421 of the external server in this case (S900: YES, S910).

Next, the CPU 111 determines whether image data D for all the pages have been received (S1060). For example, the CPU 111 determines whether the page data PD of the next page is received within a particular period after the page data PD of each page. When the page data PD of the next page is not received within the particular period after the page data PD of a certain page, it is determined that the certain page is the last page of the image data D and the page data PD of all the pages have been received. When it is determined that all the pages of the image data D have not been received (S1060: NO), the CPU 111 repeats steps from S210. When it is determined that all the pages of the image data ID have been received (S1060: YES), the CPU 111 registers the number counted by the receipt counter ZC with the RAM 113 as the number of total pages of the image data D, and terminates the receiving process.

As described above, according to the second illustrative embodiment, when the sort copying of the multiple pages of the received image data D is executed, the CPU 111 prints images of the respective pages using the image data D stored in the RAM 113. That is, according to the second illustrative embodiment, printing of the images of the respective pages is always executed based on the image data D stored in the RAM 113. Accordingly, in comparison with a conventional printer, influence of variation of the communication speed between the printer 200 and the external server 400 is suppressed, and reduction of the number of printed sheets per unit time can be suppressed.

It is noted that the techniques according to the present disclosures need not be limited to those described with reference to the first and second illustrative embodiments, but can be modified in various ways without departing the scopes/aspects thereof.

According to the embodiments described above, an external server is described as an example of the external processing device. It is noted that the external process device may include not only an external copying machine, an external printer and etc., but include an external computer. The aspects of the disclosures could be applied in such a configuration.

According to the illustrative embodiments, the processes shown in FIGS. 3-11 and 16 are executed by a single CPU 111. Such a configuration may be modified such that the processes are executed by multiple CPU's. Alternatively or optionally, multiple processes may be executed by a dedicated hardware circuit such as an ASIC (application specific integrated circuit). In such a case, the CPU, CPU's and/or hardware circuit may be examples of the controller.

According to the first illustrative embodiment, the scanning device 310 scans the original sheets G with use of the ADF 320. This configuration may be modified such that the scanning device 310 may scan multiple original sheets G subsequently placed on the upper surface of the second reading table 312. In this case, the CPU 111 may determine whether the last page of the original sheets G has been scanned by obtaining an instruction indicating the last page input through the operation unit 121. Further, when the information regarding the number of original sheets G is included in the copying instruction, the CPU 111 may determines that all the pages of the original sheets G have been scanned when the number counted by the read sheet counter YC becomes equal to the number of original sheets G included in the copying instruction.

According to the illustrative embodiments, the image data D to be stored in the memory 421 of the external server 400 is compressed before transmitted to the external server 400. This configuration is only an example, and can be modified. For example, not only the image data to be stored in the memory 421 of the external server, but the image data stored in the RAM 113 of the copying machine 100 or printer 200 may be compressed. In such a case, by setting a compression ratio at which the image data D is stored in the memory 421 of the external server 400 to be higher than a compression ratio at which the image data D is stored in the RAM 113, the size of the image data D to be stored in the memory 421 of the external server 400 is smaller than that of the image data D stored in the RAM 113.

What is claimed is:

1. A copying machine, comprising:
    a scanner configured to scan an image formed on an original sheet and generate image data;
    an original table configured such that multiple original sheets can be placed on the original table;
    an original conveyer configured to convey the multiple original sheets placed on the original table to the scanner one by one;
    a storage configured to store the image data generated by the scanner;
    a printer configured to print images on printing sheets based on the image data stored in the storage;
    a communication unit configured to communicate with an external processing device which is capable of storing the image data;
    an original sensor configured to detect whether the original sheet is present on the original table; and
    a controller,
    wherein the controller is configured to execute a copying process which includes:
    a first scanning process in which the controller causes the original conveyer to convey the multiple original sheets to the scanner one by one, stores the image data generated by the scanner in the storage in a scanned order, transmits the image data to the external processing device via the communication unit, and causes the external processing device to store the image data;

a printing process in which the controller causes the printer to print a particular number of multiple copies of the images of the original sheets copy by copy, one copy including the images of the original sheets in the scanned order;

a second scanning process in which the controller releases an area of the storage storing the image data, printing of which by the printer has been completed, causes the original conveyer to convey the multiple original sheets to the scanner one by one, stores the image data generated by the scanner in the storage in the scanned order, transmits the image data to the external processing device via the communication unit, and causes the external processing device to store the image data;

a transmission process in which the controller releases an area of the storage storing the image data, printing of which by the printer has been completed, causing the communication unit to retrieve the image data stored in the external processing device in the scanned order, and storing the retrieved image data in the storage;

a detecting process in which the controller detects whether a free capacity of the storage is less than a particular threshold value, wherein, in the copying process, the controller is further configured to:

terminate the first scanning process, and execute the printing process until the particular number of the multiple copies of the images of the original sheets are printed when it is detected that the original sheet is absent on the original table, after the first scanning process and the printing process have been started and before the free capacity of the storage is detected to be less than the particular threshold value;

terminate the first scanning process, and execute the second scanning process when it is detected that the free capacity of the storage is less than the particular threshold value, after the first scanning process and the printing process have been started and before the original sheet is detected to be absent on the original table; and terminate the second scanning process, and execute the transmission process and the printing process until the particular number of the multiple copies of the images of the original sheets are printed when it is detected, after the second scanning process has been started, the original sheet is absent on the original table, wherein when the free capacity of the storage is less than the particular threshold value during a first copy of the multiple copies is being printed, the controller is further configured to execute a process in which first image data which is stored in the storage and has been printed is deleted, second image data which is stored in the storage and has not been printed is printed, and third image data corresponding to newly scanned pages of the multiple original sheets is stored in the storage and the external processing device, the external processing device storing image data corresponding to all pages of the multiple original sheets, and wherein when a second copy of the multiple copies is printed, the controller is further configured to execute a process in which fourth image data which is stored in the storage and has been printed is deleted, fifth image data which is stored in the storage and has not been printed is printed, and sixth image data to be printed subsequently is received from the external processing device and is stored in the storage of the copying machine.

2. The copying machine according to claim 1, wherein the controller is configured to compress the image data such that a size of the image data to be transmitted to the external processing device is smaller than a size of the image data stored in the storage before the image data is transmitted to the external processing device.

3. The copying machine according to claim 1,
wherein, in the copying process, the controller is configured to:
obtain a communication speed between the communication unit and the external processing device;
release, in the second scanning process and transmission process, the area of the storage storing the image data, printing of which has completed, with the area of the storage for all pages of the image data corresponding to the images of the multiple pages of original sheets being subject to releasing when the communication speed is faster than a specific speed; and
release, in the second scanning process and transmission process, the area of the storage storing the image data, printing of which has completed, with the area of the storage for one of every N pages of the image data corresponding to the images of the multiple pages of original sheets being subject to releasing when the communication speed is equal to or slower than the specific speed, N being an integer equal to or more than two.

4. The copying machine according to claim 1,
wherein the scanner is configured to generate the image data including multiple pieces of color component data generated by scanning the image on the original sheet with applying color separation,
wherein the printer is configured to print an image using color agents respectively corresponding to the multiple pieces of color component data, and
wherein, in the copying process, the controller is configured to:
obtain a communication speed between the communication unit and the external processing device;
release, in the second scanning process and transmission process, the area of the storage storing the image data, printing of which has completed, with the area of the storage for all the multiple pieces of color component data being subject to releasing when the communication speed is faster than a specific speed; and
release, in the second scanning process and transmission process, the area of the storage storing the image data, printing of which has completed, with the area of the storage for part of the multiple pieces of color components data being subject to releasing when the communication speed is equal to or slower than the specific speed.

5. The copying machine according to claim 1,
wherein, when the original sensor detects the absence of the original sheet on the original table after the controller starts the first scanning process and the printing process, and before the controller detects in the free capacity detection process that the free capacity of the storage is less than the threshold, the controller releases the area of the external processing device storing the image data before printing of the last copy of the multiple copies of the images of the original sheets is started in the printing process.

6. The copying machine according to claim 1, further comprising an obtaining part,
wherein the controller is configured to execute a third scanning process in which the controller causes the original conveyer to convey the multiple original sheets to the scanner one by one, causes the scanner to scan the multiple original sheets and generate the image data, causes the communication unit to transmit the image data generated by the scanner to the external processing device to store the image data in the external processing device, the image data being stored only in the external processing device, and
wherein, when the obtaining part obtains instruction data including an instruction to cause the copying machine to execute another process which is different from the copying process while one of the first scanning process and the second scanning process is being executed, the controller terminates the executed one of the first scanning process and the second scanning process and starts the third scanning process.

7. A printing device, comprising:
a receiver unit configured to receive image data;
a storage configured to store the image data received by the receiver;
a printer configured to print images on printing sheets based on the image data stored in the storage;
a communication unit configured to communicate with an external processing device which is capable of storing the image data; and
a controller,
wherein the controller is configured to execute a printing process which includes:
a first receiving process in which the controller stores the image data received by the receiver in the storage in a received order, transmits the image data to the external processing device via the communication unit, and causes the external processing device to store the image data in the received order;
a printing process in which the controller causes the printer to print a particular number of multiple copies of the images corresponding to the image data in accordance with the image data stored in the storage;
a second receiving process in which the controller releases an area of the storage storing the image data, printing of which by the printer has completed, stores the image data received by the receiver in the storage in the received order, transmits the image data to the external processing device via the communication unit, and causes the external processing device to store the image data in the received order;
a transmission process in which the controller releases an area of the storage storing the image data, printing of which by the printer has been completed, causing the communication unit to retrieve the image data stored in the external processing device in the received order, and storing the retrieved image data in the storage;
a detecting process in which the controller detects whether a free capacity of the storage is less than a particular threshold value; and
a receipt completion determining process in which the controller determines whether receipt of the image data with the receiver has completed,
wherein, in the printing process, the controller is further configured to:
terminate the first receiving process, and execute the printing process until the particular number of the multiple copies of the images represented by the image data are printed when it is determined in the receipt completion determining process that receipt of the image data with the receiver has been completed, after the first receiving process and the printing process have been started and before the free capacity of the storage is detected to be less than the particular threshold value;
terminate the first receiving process, and execute the second receiving process when it is detected that the free capacity of the storage is less than the particular threshold value, after the first receiving process and the printing process have been started and before the original sheet is detected to be absent on the original table; and
terminate the second receiving process, and execute the transmission process and the printing process until the particular number of the multiple copies of the images represented by the image data are printed when it is determined in the receipt completion determining process that receipt of the image data with the receiver has been completed,
wherein when the free capacity of the storage is less than the particular threshold value during a first copy of the multiple copies is being printed, the controller is further configured to execute a process in which a first portion of the image data which is stored in the storage and has been printed is deleted, a second portion of the image data which is stored in the storage and has not been printed is printed, and a third portion of the image data corresponding to newly scanned pages is stored in the storage and the external processing device, the external processing device storing the entire portion of the image data corresponding to all pages of multiple original sheet to be printed, and
wherein when a second copy of the multiple copies is printed, the controller is further configured to execute a process in which a fourth portion of the image data which is stored in the storage and has been printed is deleted, a fifth portion of the image data which is stored in the storage and has not been printed is printed, and a sixth portion of the image data to be printed subsequently is received from the external processing device and is stored in the storage.

8. A copying machine, comprising:
a scanner configured to scan an image formed on an original sheet and generate image data;
a storage configured to store the image data generated by the scanner;
a printer configured to print an images on a printing sheet based on the image data stored in the storage;
a communication unit configured to communicate with an external processing device;
an original table on which multiple original sheets can be placed;
an original conveyer configured to convey the multiple original sheets placed on the original table to the scanner one by one;
an original sensor configured to detects whether an original sheet is present on the original table;
an instruction obtaining unit; and
a controller,
wherein the scanner is configured to scan images on the original sheets conveyed by the original conveyer,
wherein the controller is configured to execute a copying process which includes:
a number of copy setting process in which the controller receives a user input of a number of the multiple copies to be printed;

a scanning process in which the controller causes the scanner to scan images on the original sheets for a particular period from receipt of an instruction to execute scanning of the multiple original sheets through the instruction obtaining unit to detection of absence of the original sheet on the original table;

a storing-transmitting process in which the controller causes the storage to store multiple pieces of image data respectively corresponding to multiple numbers of the original sheets in a scanned order, and causes the communication unit to transmit the image data to the external processing device in the scanned order, a printing start instructing process in which the controller instructs the printer to start printing each of the multiple pieces of image data stored in the storage, wherein the controller executes, in the copying process, a first print termination instruction process to instruct the printer to terminate printing when the printer has completed printing the number of the multiple copies set in the number of copy setting process of the image data having multiple pages and stored in the storage when a free capacity of a storage area of the storage is not lower than a threshold value within the particular period, and wherein, when the free capacity of a storage area of the storage is lower than the threshold value within the particular period, the controller executes:

a first deletion process in which the controller deletes multiple pieces of image data stored in the storage on completion of printing the images represented by the multiple pieces of image data, respectively;

a transmission instruction process in which the controller instructs the external processing device to transmit multiple pieces of image data to the storage via the communication unit after execution of the first deletion process;

a second print termination instruction process in which the controller instructs the printer to terminate printing when the number of the multiple copies, which was set in the number of copy setting process, of images represented by the image data stored in the storage have been printed; and a second deletion process in which the controller deletes the multiple pieces of image data stored in the storage one by one upon completion of printing of each of the multiple pieces of image data by the printer in parallel with the second print termination instruction process, wherein when the free capacity of the storage is less than the particular threshold value during a first copy of the multiple copies is being printed, the controller is further configured to execute a process in which first image data which is stored in the storage and has been printed is deleted, second image data which is stored in the storage and has not been printed is printed, and third image data corresponding to newly scanned pages of the multiple original sheets is stored in the storage and the external processing device, the external processing device storing image data corresponding to all pages of the multiple original sheets, and wherein when a second copy of the multiple copies is printed, the controller is further configured to execute a process in which fourth image data which is stored in the storage and has been printed is deleted, fifth image data which is stored in the storage and has not been printed is printed, and sixth image data to be printed subsequently is received from the external processing device and stored in the storage of the copying machine.

9. A copying machine, comprising:
a scanner configured to scan an image formed on an original sheet and generate image data;
a storage configured to store the image data generated by the scanner;
a printer configured to print an image on a printing sheet based on the image data stored in the storage;
a communication unit configured to communicate with an external processing device;
a light transmitting member on which the original sheet is to be placed; and
a moving unit configured to move the scanner in a moving direction which extends along the light transmitting member;
an instruction obtaining unit; and
a controller,
wherein the controller is configured to execute a copying process which includes:
a number of copy setting process in which the controller receives a user input of a number of multiple copies to be printed;
a scanning process in which the controller causes the scanner to scan images on the original sheets for a particular period from receipt of an instruction indicating that the original sheet is the last original sheet through the instruction obtaining unit;
a storing-transmitting process in which the controller causes the storage to store multiple pieces of image data respectively corresponding to multiple numbers of original sheets in a scanned order, and causes the communication unit to transmit the image data to the external processing device in the scanned order; and
a printing start instructing process in which the controller instructs the printer to start printing each of the multiple pieces of image data stored in the storage,
wherein the controller executes, in the copying process, a first print termination instruction process to instruct the printer to terminate printing when the printer has completed printing the number of the multiple copies set in the number of copy setting process of the image data having multiple pages and stored in the storage when a free capacity of the storage is not lower than a threshold value within the particular period,
wherein, when the free capacity of the storage is lower than the threshold value within the particular period, the controller executes:
a first deletion process in which the controller deletes multiple pieces of image data stored in the storage on completion of printing the images represented by the multiple pieces of image data, respectively;
a transmission instruction process in which the controller instructs the external processing device to transmit multiple pieces of image data to the storage via the communication unit after execution of the first deletion process;
a second print termination instruction process in which the controller instructs the printer to terminate printing when the number of the multiple copies, which was set in the number of copy setting process, of images represented by the image data stored in the storage have been printed; and
a second deletion process in which the controller deletes the multiple pieces of image data stored in the storage one by one upon completion of printing of each of the multiple pieces of image data by the printer in parallel with the second print termination instruction process, wherein when the free capacity of the storage is less than the threshold value during a first copy of the multiple copies is being printed, the controller is further configured to execute a process in which first image data which is stored in the storage and has been printed is deleted, second image data which is stored in the storage and has not been printed is printed, and third image data corresponding to newly scanned pages of the multiple original sheets is stored in the storage and the external processing device, the external processing device storing image data corresponding to all pages of the multiple original sheets, and wherein when a second copy of the multiple copies is printed, the controller is further configured to execute a process in which fourth image data which is stored in the storage and has been printed is deleted, fifth image data which is stored in the storage and has not been printed is printed, and sixth image data to be printed subsequently is received from the external processing device and is stored in the storage of the copying machine.

10. A copying machine, comprising:

a scanner configured to scan an image formed on an original sheet and generate image data;

an original table configured such that multiple original sheets can be placed on the original table;

an original conveyer configured to convey the multiple original sheets placed on the original table to the scanner one by one;

a storage configured to store the image data generated by the scanner;

a printer configured to print images on printing sheets based on the image data stored in the storage;

a communication unit configured to communicate with an external processing device which is capable of storing the image data;

an original sensor configured to detect whether the original sheet is present on the original table; and a controller, wherein the controller is configured to execute a copying process which includes:

a first scanning process in which the controller causes the original conveyer to convey the multiple original sheets to the scanner one by one, stores the image data generated by the scanner in the storage in a scanned order, transmits the image data to the external processing device via the communication unit, and causes the external processing device to store the image data;

a printing process in which the controller causes the printer to print a particular number of multiple copies of the images of the original sheets copy by copy, one copy including the images of the original sheets in the scanned order;

a second scanning process in which the controller releases an area of the storage storing the image data, printing of which by the printer has been completed, causes the original conveyer to convey multiple original sheets to the scanner one by one, stores the image data generated by the scanner in the storage in the scanned order, transmits the image data to the external processing device via the communication unit, and causes the external processing device to store the image data;

a transmission process in which the controller releases an area of the storage storing the image data, printing of which by the printer has been completed, causing the communication unit to retrieve the image data stored in the external processing device in the scanned order, and storing the retrieved image data in the storage;

a detecting process in which the controller detects whether a free capacity of the storage is less than a particular threshold value, wherein, in the copying process, the controller is further configured to:

terminate the first scanning process, and execute the printing process until the particular number of the multiple copies of the images of the original sheets are printed when it is detected that the original sheet is absent on the original table, after the first scanning process and the printing process have been started and before the free capacity of the storage is detected to be less than the particular threshold value;

terminate the first scanning process, and execute the second scanning process when it is detected that the free capacity of the storage is less than the particular threshold value, after the first scanning process and the printing process have been started and before the original sheet is detected to be absent on the original table; and terminate the second scanning process, and execute the transmission process and the printing process until the particular number of the multiple copies of the images of the original sheets are printed when it is detected, after the second scanning process has been started, the original sheet is absent on the original table, wherein, in the copying process, the controller is configured to:

obtain a communication speed between the communication unit and the external processing device;

release, in the second scanning process and transmission process, the area of the storage storing the image data, printing of which has completed, with the area of the storage for all pages of the image data corresponding to the images of the multiple pages of the original sheets being subject to releasing when the communication speed is faster than a specific speed; and release, in the second scanning process and transmission process, the area of the storage storing the image data, printing of which has completed, with the area of the storage for one of every N pages of the image data corresponding to the images of the multiple pages of the original sheets being subject to releasing when the communication speed is equal to or slower than the specific speed, N being an integer equal to or more than two.

* * * * *